US012784637B2

(12) United States Patent
Chou et al.

(10) Patent No.: US 12,784,637 B2
(45) Date of Patent: Nov. 3, 2026

(54) DISPLAY APPARATUS AND PANEL VOLTAGE MULTIPLEXING METHOD THEREOF

(71) Applicant: Samsung Electronics Co., Ltd., Suwon-si (KR)

(72) Inventors: Chihhsien Chou, Zhubei (TW); Yun Pin Li, Zhubei (TW); Seunghee Kuk, Zhubei (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/046,168

(22) Filed: Feb. 5, 2025

(65) Prior Publication Data

US 2026/0065832 A1 Mar. 5, 2026

(30) Foreign Application Priority Data

Aug. 29, 2024 (TW) ................................ 113132502

(51) Int. Cl.
*G09G 5/00* (2006.01)
*G09G 3/20* (2006.01)

(52) U.S. Cl.
CPC ... *G09G 3/2092* (2013.01); *G09G 2300/0452* (2013.01); *G09G 2310/0297* (2013.01); *G09G 2330/021* (2013.01)

(58) Field of Classification Search
CPC ......... G09G 3/2092; G09G 2300/0452; G09G 2310/0297; G09G 2330/021
USPC ........................................................ 345/214
See application file for complete search history.

(56) References Cited

U.S. PATENT DOCUMENTS

| | | | | |
|---|---|---|---|---|
| 11,210,983 | B2 | 12/2021 | Jang et al. | |
| 11,488,512 | B2 | 11/2022 | Wang et al. | |
| 11,741,907 | B2 | 8/2023 | Yoon et al. | |
| 11,929,037 | B2 | 3/2024 | Hong et al. | |
| 11,935,453 | B2 | 3/2024 | Park et al. | |
| 2019/0251908 | A1 * | 8/2019 | Kim ..................... | G09G 3/3275 |
| 2020/0211486 | A1 * | 7/2020 | Wang ................... | G09G 3/3614 |
| 2020/0388205 | A1 * | 12/2020 | Bae ...................... | G09G 3/2003 |
| 2022/0351667 | A1 | 11/2022 | Jang et al. | |
| 2022/0366842 | A1 * | 11/2022 | Kwon .................. | G09G 3/3208 |
| 2024/0185752 | A1 * | 6/2024 | Park ..................... | G09G 3/2003 |

* cited by examiner

*Primary Examiner* — Jennifer T Nguyen
(74) *Attorney, Agent, or Firm* — FISH & RICHARDSON P.C.

(57) ABSTRACT

Disclosed are a display apparatus and a panel voltage multiplexing method thereof. The display apparatus includes a source driver, a pixel array, a plurality of panel traces, and a multiplexer circuit. The source driver has a plurality of data channels respectively including output terminals configured to provide panel voltages. The pixel array has first color pixel circuits, second color pixel circuits, and third color pixel circuits in an array. Odd-numbered panel traces of the panel traces are alternately coupled to a portion of the first color pixel circuits and a portion of the second color pixel circuits, and the even-numbered panel traces of the panel traces are coupled to a portion of the third color pixel circuits. Switches of the multiplexer circuit are configured to couple the output of each of the data channels to two odd-numbered panel traces or to two even-numbered panel traces.

12 Claims, 27 Drawing Sheets

DISPLAY APPARATUS AND PANEL VOLTAGE MULTIPLEXING METHOD THEREOF

CROSS-REFERENCE TO RELATED APPLICATION

This application claims the priority benefit of Taiwan application serial no. 113132502, filed on Aug. 29, 2024. The entirety of the above-mentioned patent application is hereby incorporated by reference herein and made a part of this specification.

BACKGROUND

Technical Field

The present disclosure relates to display apparatuses, and in particular, to display apparatuses having a multiplexer circuit and a panel voltage multiplexing method thereof.

Description of Related Art

A conventional electronic multiplexer (EMUX) circuit may switch even-numbered pixel columns and odd-numbered pixel columns, and a switch may be adopted to replace the original multiplexer circuit on the panel. In order to reduce the on-resistance of the electronic multiplexer circuit, the switch may be moved to an integrated circuit (IC) to achieve lower on-resistance to reduce the power consumption of the display apparatus.

In recent years, the widespread application of Organic Light-Emitting Diodes (OLEDs) in portable devices has rendered the issue of energy conservation in OLEDs advantageous. Within the integrated circuit (IC) of a source driver (SD), the power supply may be managed by a lower voltage power management integrated circuit to reduce power consumption. However, the conventional electronic multiplexer structure consumes more power compared to the 1:1 multiplexer structure with red, green, and blue (RGB) images.

SUMMARY

The present disclosure provides display apparatuses and a panel voltage multiplexing methods thereof, which may reduce the power consumption of a source driver when displaying a specific picture.

The display apparatus of the present disclosure includes a source driver, a pixel array, a plurality of panel traces, and a multiplexer circuit. The source driver has a plurality of data channels respectively including output terminals configured to provide panel voltages. The pixel array has a plurality of first color pixel circuits, a plurality of second color pixel circuits, and a plurality of third color pixel circuits in an array. The panel traces have a plurality of odd-numbered panel traces and a plurality of even-numbered panel traces alternately, wherein each of the odd-numbered panel traces is alternately coupled to a portion of the first color pixel circuits and a portion of the second color pixel circuits, and each of the even-numbered panel traces is coupled to a portion of the third color pixel circuits. The multiplexer circuit has a plurality of switches, which are configured to couple the output terminal of each of the data channels to two odd-numbered panel traces of the odd-numbered panel traces or to two even-numbered panel traces of the even-numbered panel traces.

In a panel voltage multiplexing method of the display apparatus of the present disclosure, the display apparatus includes a plurality of data channels configured to provide a plurality of panel voltages, a pixel array having a plurality of first color pixel circuits, a plurality of second color pixel circuits, and a plurality of third color pixel circuits in an array, a plurality of odd-numbered panel traces individually and alternately coupling a portion of the first color pixel circuits and a portion of the second color pixel circuits, a plurality of even-numbered panel traces individually coupling a portion of the third color pixel circuits, and a multiplexer circuit having a plurality of switches. The panel voltage multiplexing method includes the following steps. The output terminal of each of the data channels is coupled to two odd-numbered panel traces of the odd-numbered panel traces or to two even-numbered panel traces of the even-numbered panel traces through the plurality of switches of the multiplexer circuit. During a plurality of horizontal scanning periods, one of the switches coupled to the output terminal of each of the data channels is turned on correspondingly to alternately transmit the panel voltages to the odd-numbered panel traces and the even-numbered panel traces.

Based on the above, the display apparatus and the panel voltage multiplexing method thereof in some example embodiments of the present disclosure may couple the output terminal of each of the data channels to two odd-numbered panel traces which couple the first color pixel circuit and the second color pixel through the plurality of switches, or to two even-numbered panel traces that couple the third color pixel circuit. In this way, even if the panel traces are switched through the multiplexer circuit, the panel load seen at the output terminal of the data channel may be the same or substantially the same. Therefore, the probability of voltage level switching at the output terminal of the data channel may be significantly reduced, thereby reducing power consumption of the source driver.

BRIEF DESCRIPTION OF THE DRAWINGS

In order to make the above-mentioned features and advantages of the present disclosure more obvious and easy to understand, example embodiments are given below and described in detail with reference to the accompanying drawings.

DESCRIPTION OF SOME EXAMPLE EMBODIMENTS

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be understood that, although the terms "first," "second," "third," and so forth may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a "first element," "component," "region," "layer," or "section" discussed below could be termed a second element, component, region, layer, or section without departing from the teachings of the present disclosure.

The terminology used herein is for the purpose of describing particular embodiments only and is not intended to be limiting. As used herein, the singular forms "a," "an," and "the" are intended to include the plural forms as well, including "at least one" or represent "and/or" unless the context clearly indicates otherwise. As used herein, the term "and/or" includes any and all combinations of one or more of the associated listed items. It should also be understood that, when used in this specification, the terms "comprises" and/or "comprising" specify the presence of stated features, regions, integers, steps, operations, elements, and/or components, but do not exclude the presence or addition of one or more other features, regions, integers, steps, operations, elements, components, and/or groups thereof.

Figure 1A:
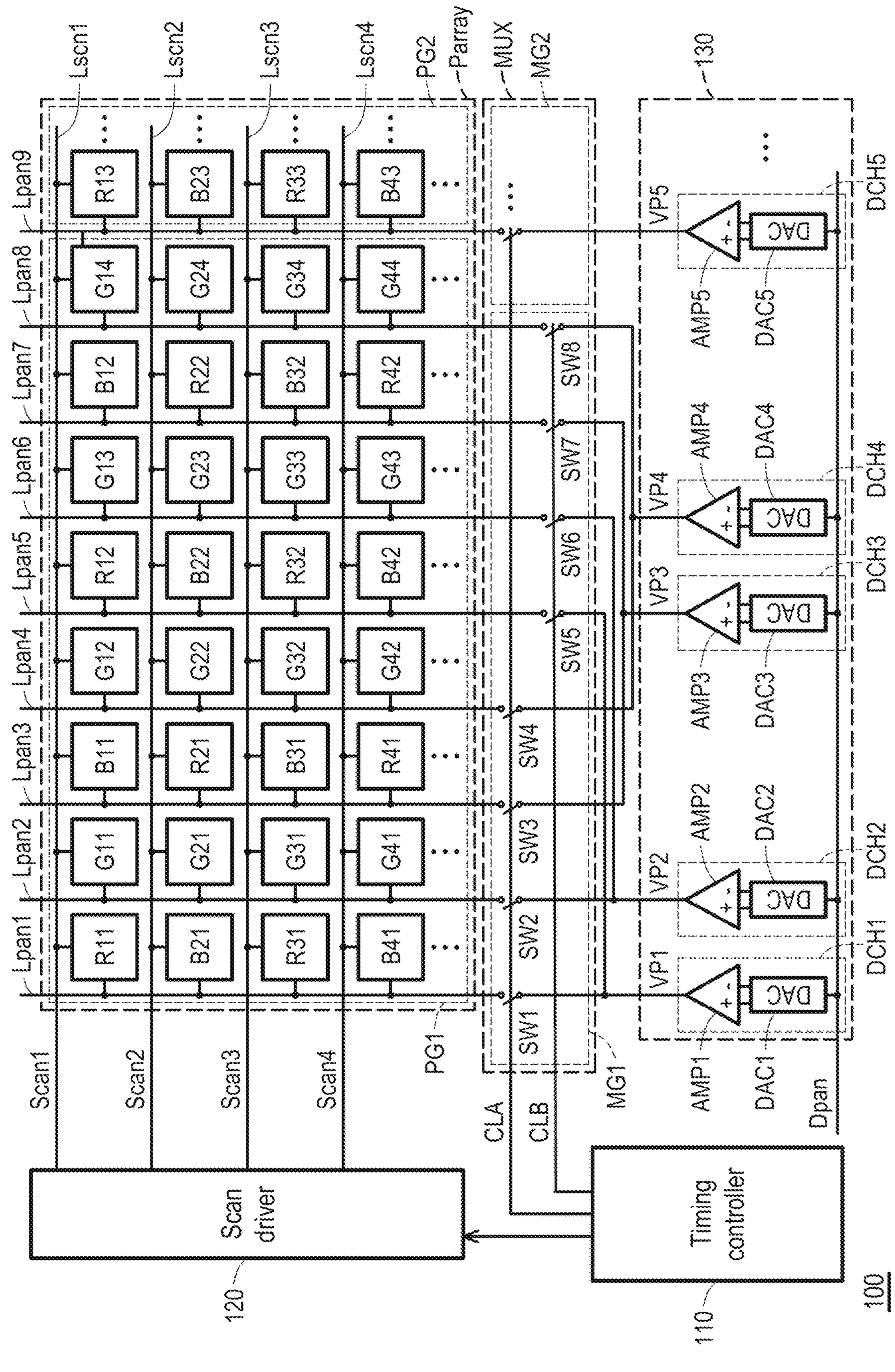
FIG. 1A is a system schematic diagram of a display apparatus according to some example embodiments of the present disclosure.

FIG. 1A is a system schematic diagram of a display apparatus according to some example embodiments of the present disclosure. Please refer to FIG. 1A. In some example embodiments, the display apparatus 100 includes a timing controller 110, a scan driver 120, a source driver 130, a multiplexer circuit MUX, a pixel array Parray, a plurality of scan traces (such as Lscn1 to Lscn4), and a plurality of panel traces (such as Lpan1 to Lpan9). The timing controller 110 is coupled to the scan driver 120, the source driver 130 and the multiplexer circuit MUX to control the scan driver 120 to provide a plurality of scan signals (such as Scan1 to Scan4), so as to provide panel data Dpan to the source driver 130, and provide the control signals CLA and CLB to the multiplexer circuit MUX.

The source driver 130 has a plurality of data channels (such as DCH1 to DCH5), and after receiving the panel data Dpan, the data channels (such as DCH1 to DCH5) provide a plurality of panel voltages (such as VP1 to VP5) at the output terminal thereof according to the panel data Dpan.

The pixel array Parray has a plurality of red pixel circuits (such as R11 to R13, R21 to R22, R31 to R33, R41 to R42, corresponding to the first color pixel circuit), a plurality of blue pixel circuits (such as B11 to B12, B21 to B23, B31 to B32, B41 to B43, corresponding to the second color pixel circuit), and a plurality of green pixel circuits (such as G11 to G14, G21 to G24, G31 to G34, G41 to G44, corresponding to the third color pixel circuit) arranged in an array and divided into a plurality of pixel groups (such as PG1, PG2).

Scan traces (such as Lscn1 to Lscn4) are coupled to the scan driver 120 to receive corresponding scan signals (such as Scan1 to Scan4), and are individually coupled to a row of pixel circuits (such as red pixel circuits R11 to R42, blue pixel circuits B11 to B43, and green pixel circuits G11 to G44). The panel traces (such as Lpan1 to Lpan9) are perpendicular or substantially perpendicular to the scan traces (such as Lscn1 to Lscn4), with each of the odd-numbered panel traces (such as Lpan1, Lpan3, Lpan5, Lpan7, Lpan9) in the panel traces (such as Lpan1 to Lpan9) alternately coupled to a portion of the red pixel circuits (such as R11 to R42) and a portion of the blue pixel circuits (such as B11 to B43), and each of the even-numbered panel traces (such as Lpan2, Lpan4, Lpan6, Lpan8) alternately disposed with the odd-numbered panel traces (such as Lpan1, Lpan3, Lpan5, Lpan7, Lpan9) coupled to a portion of the green pixel circuit (such as G11 to G44).

The multiplexer circuit MUX has a plurality of switches (e.g., SW1 to SW8), and the switches (e.g., SW1 to SW8) are coupled to couple the output terminal of each of the data channels (e.g., DCH1 to DCH5) to two odd-numbered panel traces of the odd-numbered panel traces (such as Lpan1, Lpan3, Lpan5, Lpan7, Lpan9) or to two even-numbered panel traces of the even-numbered panel traces (such as Lpan2, Lpan4, Lpan6, Lpan8). For example, the output terminal of the data channel DCH1 is coupled to the panel traces Lpan1 and Lpan5, and the output terminal of the data channel DCH2 is coupled to the panel traces Lpan2 and Lpan6, as shown in the figure, here no further details will be incorporated herein. Moreover, through the switching of switches (such as SW1 to SW8), the panel voltage VP1 provided by the output terminal of the data channel DCH1 may be provided to the panel traces Lpan1 and Lpan5 in sequence, and the panel voltage provided by the output terminal of the data channel DCH2 VP2 may be provided to panel traces Lpan2 and Lpan6 in sequence, which are shown in the figure and will not be described again here. As such, the pixel array Parray may display or output an image related to the panel data Dpan.

Based on the above, for odd-numbered data channels (such as DCH1, DCH3, DCH5), the received panel data Dpan will correspond to two red pixel circuits, two blue pixel circuits, and two red pixel circuits in sequence, and so forth; moreover, for even-numbered data channels (such as DCH2, DCH4), the received panel data Dpan will always correspond to the green pixel circuits. In other words, even if the panel traces (such as Lpan1 to Lpan9) are switched through the multiplexer circuit MUX, the panel load seen at the output terminal of each data channel (such as DCH1 to DCH5) during different horizontal scanning periods will be the same or substantially the same. That is, the panel voltage (such as VP1 to VP5) provided by the output terminal of each data channel (such as DCH1 to DCH5) during the current horizontal scanning period will be similar to the panel voltage (such as VP1 to VP5) provided during a next currently horizontal scanning period. Therefore, the probability of voltage level switching at the output terminal of the data channel (such as DCH1 to DCH5) will be significantly reduced, thereby reducing power consumption of the source driver 130.

In some example embodiments, the switches (such as SW1 to SW8) in the multiplexer circuit MUX are divided into a plurality of switch groups (such as MG1, MG2). The switch groups (such as MG1, MG2) may have the same or similar structure, however, the inventive concepts are not limited thereto. In some example embodiments, each switch group (taking switch group MG1 as an example) includes, for example, a first switch SW1, a second switch SW2, a third switch SW3, a fourth switch SW4, a fifth switch SW5, a sixth switch SW6, a seventh switch SW7, and an eighth switch SW8.

The first switch SW1 is coupled between the output terminal of the data channel DCH1 (corresponding to the first data channel) and the panel trace Lpan1 (corresponding to the first odd-numbered panel trace). The second switch SW2 is coupled between the output terminal of the data channel DCH2 (corresponding to the second data channel) and the panel trace Lpan2 (corresponding to the first even-numbered panel trace). The third switch SW3 is coupled between the output terminal of the data channel DCH3 (corresponding to the third data channel) and the panel trace Lpan3 (corresponding to the second odd-numbered panel trace). The fourth switch SW4 is coupled between the output terminal of the data channel DCH4 (corresponding to the fourth data channel) and the panel trace Lpan4 (corresponding to the second even-numbered panel trace).

The fifth switch SW5 is coupled between the output terminal of the data channel DCH1 and the panel trace Lpan5 (corresponding to the third odd-numbered panel trace). The sixth switch SW6 is coupled between the output terminal of the data channel DCH2 and the panel trace Lpan6 (corresponding to the third even-numbered panel trace). The seventh switch SW7 is coupled between the output terminal of the data channel DCH3 and the panel trace Lpan7 (corresponding to the fourth odd-numbered panel trace). The eighth switch SW8 is coupled between the output terminal of the data channel DCH4 and the panel trace Lpan8 (corresponding to the fourth even-numbered panel trace). In other words, the i-th data channel (such as DCH1 to DCH5) is coupled to the i-th and i+4-th panel trace (such as Lpan1 to Lpan9) through the switch (such as SW1 to SW8) in the multiplexer circuit MUX, i being a positive integer.

In some example embodiments, the first switch SW1, the second switch SW2, the third switch SW3, and the fourth switch SW4 receive (that is, are controlled by) the control signal CLA, and the fifth switch SW5, the sixth switch SW6, the seventh switch SW7, and the eighth switch SW8 receive (e.g., are controlled by) the control signal CLB. Only one of the control signals CLA and CLB may be enabled at a time to prevent the panel voltage (such as VP1 to VP5) from being transmitted to the two panel traces (such as Lpan1 to Lpan9) simultaneously.

In some example embodiments, each data channel (e.g., DCH1 to DCH5) includes, for example, a digital-to-analog converter (DAC) (e.g., DAC1 to DAC5) and an amplifier (e.g., AMP1 to AMP5). The digital-to-analog converters (such as DAC1 to DAC5) are configured to convert the received panel data Dpan into analog voltages, while amplifiers (such as AMP1 to AMP5) generate panel voltages (such as VP1 to VP5) based on the converted voltage.

Figure 1B:
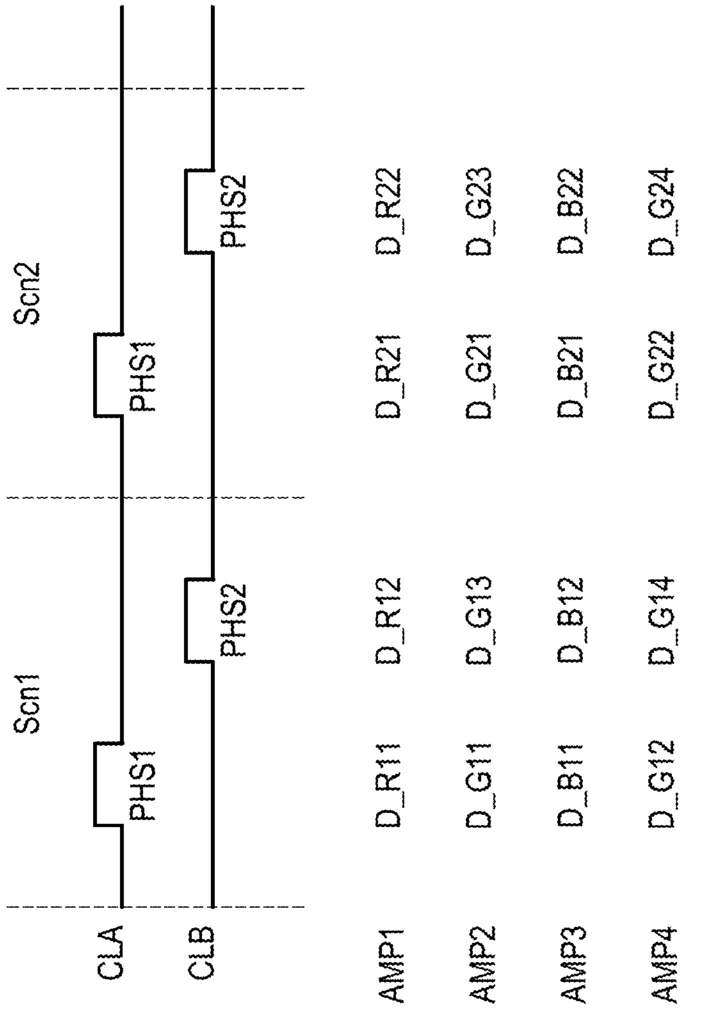
FIG. 1B is a schematic diagram of a driving waveform of a multiplexer circuit according to some example embodiments of the present disclosure.

FIG. 1B is a schematic diagram of a driving waveform of a multiplexer circuit according to some example embodiments of the present disclosure. Please refer to FIG. 1A and FIG. 1B. In some example embodiments, the control signal CLA is enabled (that is, turned on, for example, at a high level) during the first phase period PHS1 of the horizontal scanning period (that is, the time of one scanning line, as shown by Scn1 and Scn2, corresponding to the first horizontal scanning period and the second horizontal scanning period), and the control signal CLB is enabled in the second phase period PHS2 of the horizontal scanning period (such as Scn1, Scn2), and remains disabled for the rest of the time (e.g. turned off, e.g. low level). The first phase period PHS1 precedes and does not overlap with the second phase period PHS2, and the same or similar elements are denoted by the same or similar numbers.

Based on the above, in the first phase period PHS1 of the first horizontal scanning period Scn1, the amplifier AMP1 of the data channel DCH1 is connected to the red pixel circuit R11 through the turned-on first switch SW1, that is, the panel voltage VP1 corresponds to the panel data D_R11 of the red pixel circuit R11; the amplifier AMP2 of the data channel DCH2 is connected to the green pixel circuit G11 through the turned-on second switch SW2, that is, the panel voltage VP2 corresponds to the panel data D_G11 of the green pixel circuit G11; the amplifier AMP3 of the data channel DCH3 is connected to the blue pixel circuit B11 through the turned-on third switch SW3, that is, the panel voltage VP3 corresponds to the panel data D_B11 of the blue pixel circuit B11; moreover, the amplifier AMP4 of the data channel DCH4 is connected to the green pixel circuit G12 through the turned-on fourth switch SW4, that is, the panel voltage VP4 corresponds to the panel data D_G12 of the green pixel circuit R12.

Then, the control signal CLA is turned off, and the control signal CLB is turned on, and the second phase period PHS2 in the horizontal scanning period Scn1 begins. In the second phase period PHS1 of the horizontal scanning period Scn1, the amplifier AMP1 of the data channel DCH1 is connected to the red pixel circuit R12 through the turned-on fifth switch SW2, that is, the panel voltage VP1 corresponds to the panel data D_R12 of the red pixel circuit R12; the amplifier AMP2 of the data channel DCH2 is connected to the green pixel circuit G13 through the turned-on sixth switch SW6, that is, the panel voltage VP2 corresponds to the panel data D_G13 of the green pixel circuit G13; the amplifier AMP3 of the data channel DCH3 is connected to the blue pixel circuit B12 through the turned-on seventh switch SW7, that is, the panel voltage VP3 corresponds to the panel data D_B13 of the blue pixel circuit B13; moreover, the amplifier AMP4 of the data channel DCH4 is connected to the green pixel circuit G14 through the turned-on eighth switch SW8, that is, the panel voltage VP4 corresponds to the panel data D_G14 of the green pixel circuit R14.

After the second phase period PHS2 of the first horizontal scanning period Scn1, the scanning of one row of pixels is completed, and then the second horizontal scanning period Scn2 (continuing after the first horizontal scanning period Scn1) begins. For example, the second horizontal scanning period Scn2 may begin immediately or a short time (e.g., about or exactly a tenth of a scanning period) thereafter of the first horizontal scanning period Scn1. In some example embodiments, the operations in the second horizontal scanning period Scn2 are the same or substantially the same as those of the first horizontal scanning period Scn1. Therefore, reference can be made to the above example embodiments and will not be described again here.

Figure 2A:
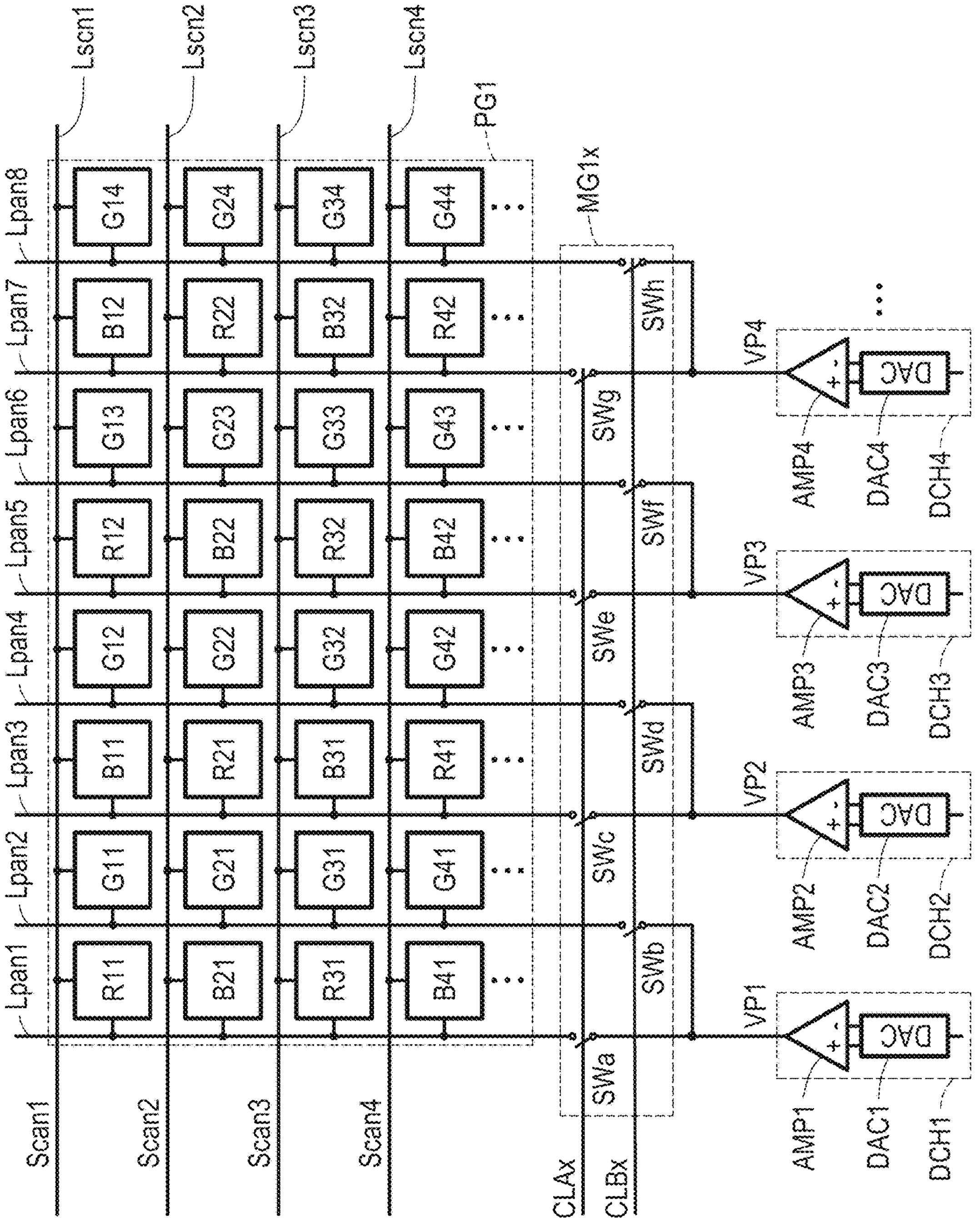
FIG. 2A (PRIOR ART)
FIG. 2A is a circuit diagram of a conventional multiplexer circuit.

FIG. 2A is a circuit diagram of a conventional multiplexer circuit. Please refer to FIG. 1A and FIG. 2A. In a conventional multiplexer circuit, a switch group (as shown in MG1*x*) may include 8 switches SWa to SWh. The difference between them is that the switches SWa to SWh couple each data channel (such as DCH1 to DCH5) to two adjacent panel traces (such as Lpan1 to Lpan9), that is, each data channel (such as DCH1 to DCH5) is coupled to two adjacent pixel columns. The switches SWa, SWc, SWe, and SWg receive (that is, are controlled by) the control signal CLAx, and the switches SWb, SWd, SWf, and SWh receive (that is, are controlled by) the control signal CLBx. The same or similar elements are denoted by the same or similar reference numerals.

Figure 2B:
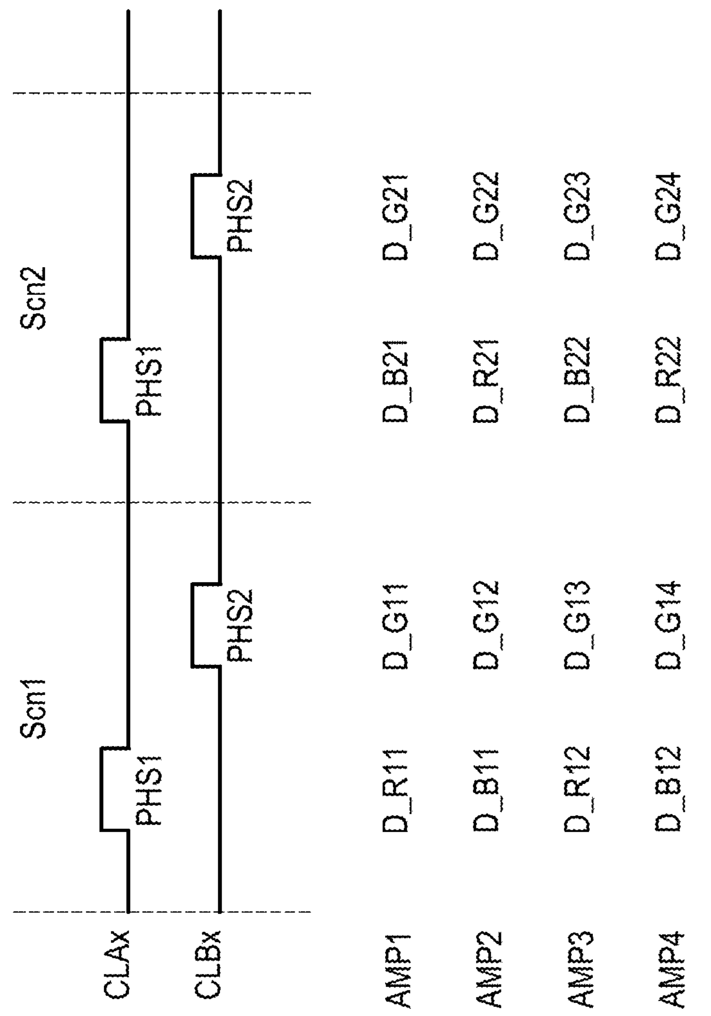
FIG. 2B (PRIOR ART)
FIG. 2B is a schematic diagram illustrating a driving waveform of a conventional multiplexer circuit.

FIG. 2B is a schematic diagram illustrating a driving waveform of a conventional multiplexer circuit. Please refer to FIG. 1A, FIG. 1B, FIG. 2A and FIG. 2B. In the conventional multiplexer circuit, the timing of the control signals CLAx and CLBc is the same or substantially the same as the control signals CLA and CLB. However, during the horizontal scanning periods Scn1 and Scn2, the panel voltage VP1 provided by the amplifier AMP1 of the data channel DCH1 sequentially corresponds to the panel data D_R11 of the red pixel circuit R11, corresponds to the panel data D_G11 of the green pixel circuit G11, corresponds to the panel data D_B21 of the blue pixel circuit B21, and corresponds to the panel data D_G21 of the green pixel circuit G21; the panel voltage VP2 provided by the amplifier AMP2 of the data channel DCH2 sequentially corresponds to the panel data D_B11 of the blue pixel circuit B11, corresponds to the panel data D_G12 of the green pixel circuit G12, corresponds to the panel data D_R21 of the red pixel circuit R21, and corresponds to the panel data D_G22 of the green pixel circuit G22; the panel voltage VP3 provided by the amplifier AMP3 of the data channel DCH3 sequentially corresponds to the panel data D_R12 of the red pixel circuit R12, corresponds to the panel data D_G13 of the green pixel circuit G13, corresponds to the panel data D_B22 of the blue pixel circuit B22, and corresponds to the panel data D_G23 of the green pixel circuit G23; the panel voltage VP4 provided by the amplifier AMP4 of the data channel DCH4 sequentially corresponds to the panel data D_B12 of the blue pixel circuit B12, corresponds to the panel data D_G14 of the green pixel circuit G14, corresponds to the panel data D_R22 of the red pixel circuit R22, and corresponds to the panel data D_G24 of the green pixel circuit G24.

From the above, it can be understood that through the operation of the conventional multiplexer circuit, the panel data Dpan received by each data channel (such as DCH1 to DCH5) will be continuously switched to pixel circuits of different colors, thus causing additional power consumption.

Figure 3A:
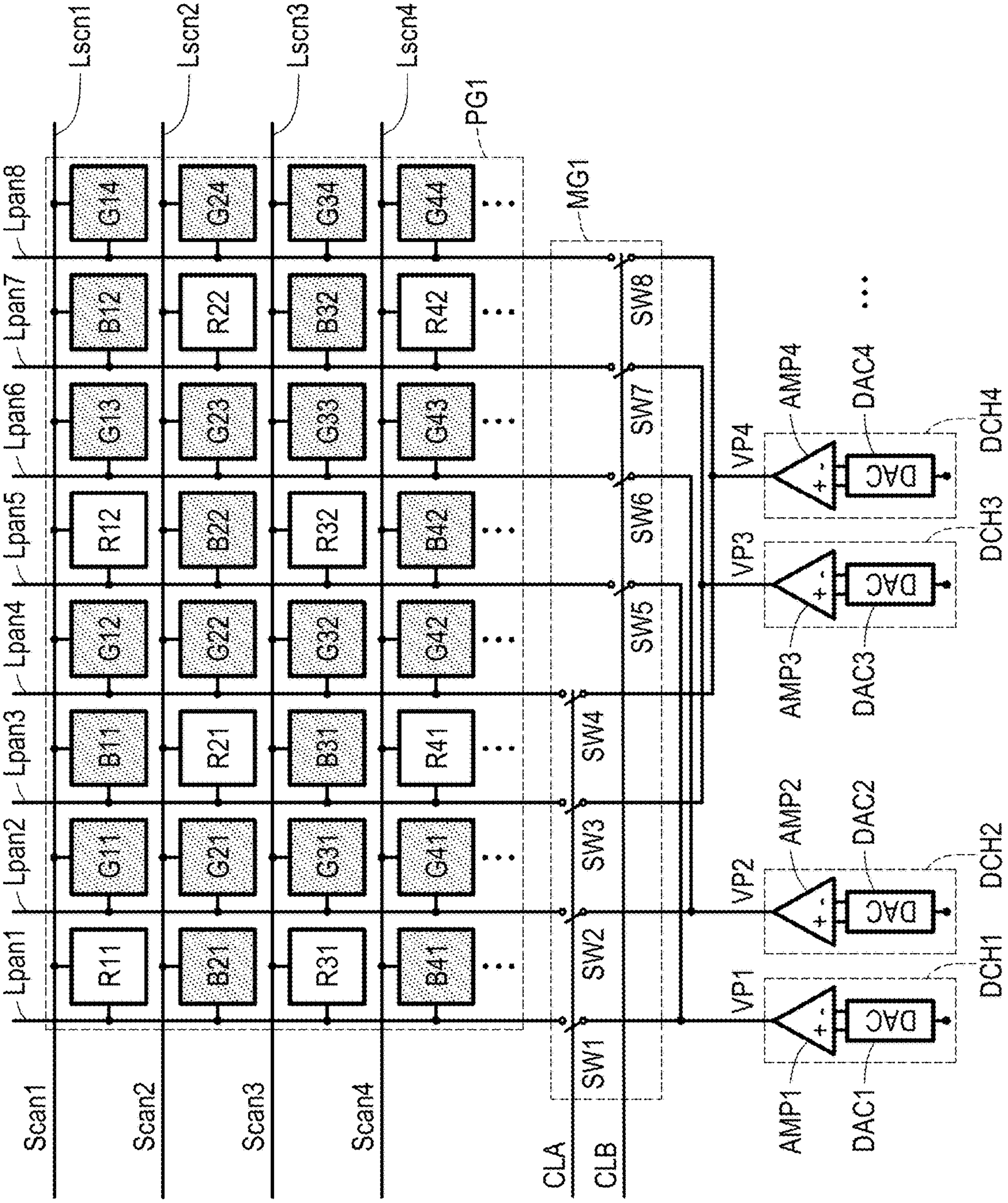
FIG. 3A is a circuit diagram of a pixel array displaying a pure red picture according to some example embodiments of the present disclosure.
Figure 3B:
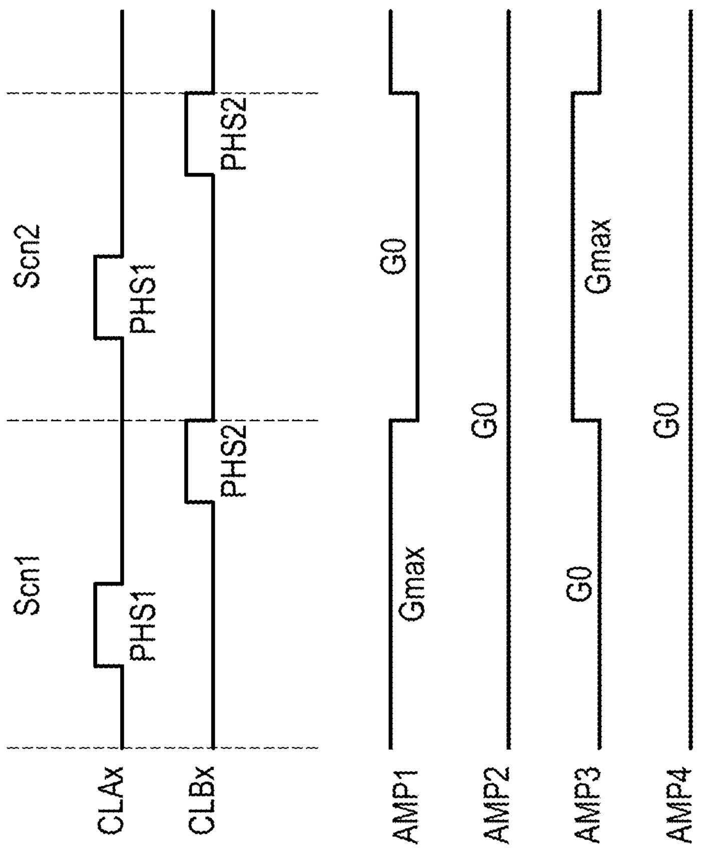
FIG. 3B is a schematic diagram illustrating a driving waveform of a pixel array displaying a pure red picture according to some example embodiments of the present disclosure.

FIG. 3A is a circuit diagram of a pixel array displaying a pure red picture according to some example embodiments of the present disclosure. FIG. 3B is a schematic diagram illustrating a driving waveform of a pixel array displaying a pure red picture according to some example embodiments of the present disclosure. Please refer to FIG. 1A, FIG. 1B, FIG. 3A and FIG. 3B. Only the pixel group PG1, the switch group MG1 and the data channels DCH1 to DCH4 are shown for ease of explanation. However, the inventive concepts are not limited thereto. Identical or similar elements are denoted by the same or similar reference numbers.

In some example embodiments, during the horizontal scanning period Scn1, the panel voltage VP1 provided by the amplifier AMP1 of the data channel DCH1 continues to correspond to the maximum gray scale value Gmax, and the panel voltage VP2 provided by the amplifier AMP2 of the data channel DCH2, the panel voltage VP3 provided by the amplifier AMP3 of the data channel DCH3 and the panel voltage VP4 provided by the amplifier AMP4 of the data channel DCH4 continuously correspond to the minimum gray scale value G0. During the horizontal scanning period Scn2, the panel voltage VP3 provided by the amplifier AMP3 of the data channel DCH3 continuously corresponds to the maximum gray scale value Gmax, the panel voltage VP1 provided by the amplifier AMP1 of the data channel DCH1, the panel voltage VP2 provided by the amplifier AMP2 of the data channel DCH2, and the panel voltage VP4 provided by the amplifier AMP4 of the data channel DCH4 continuously correspond to the minimum gray scale value G0.

Based on the above, the panel voltages VP1 and VP3 provided by the data channels DCH1 and DCH3 responsible for the red pixel circuit (such as R11 to R42) and the blue pixel circuit (B11 to B43) are only switched once (e.g., raised and lowered once), but the panel voltages VP2 and VP4 provided by the data channels DCH2 and DCH4 responsible for the green pixel circuit (such as G11 to G44) are always maintained at the minimum gray scale value G0.

Figure 4A:
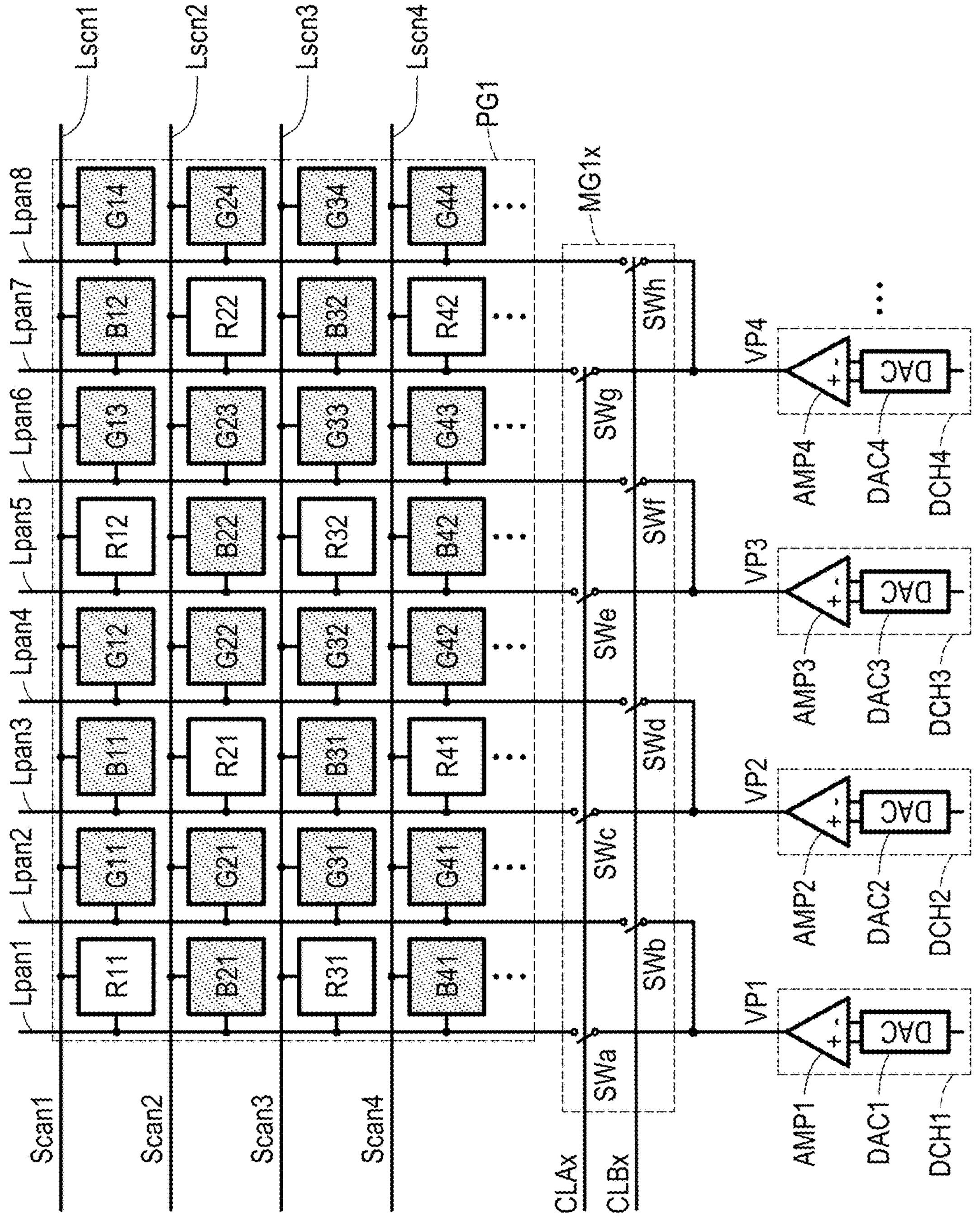
FIG. 4A (PRIOR ART)
FIG. 4A is a circuit diagram of a conventional multiplexer circuit that displays a pure red picture in a pixel array.
Figure 4B:
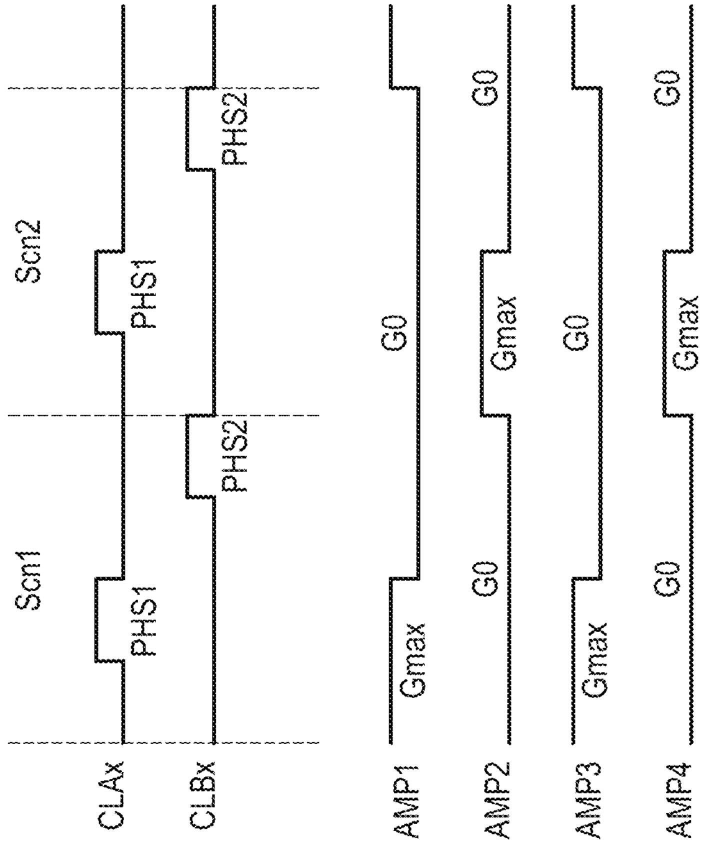
FIG. 4B (PRIOR ART)
FIG. 4B is a schematic diagram illustrating a driving waveform of a conventional multiplexer circuit that displays a pure red picture in a pixel array.

FIG. 4A is a circuit diagram of a conventional multiplexer circuit that displays a pure red picture in a pixel array. FIG. 4B is a schematic diagram illustrating a driving waveform of a conventional multiplexer circuit that displays a pure red picture in a pixel array. Please refer to FIG. 1A, FIG. 1B, FIG. 2A, FIG. 2B, FIG. 3A, FIG. 3B, FIG. 4A and FIG. 4B. Only the pixel group PG1, the switch group MG1*x* and the data channels DCH1 to DCH4 are shown for ease of explanation. However, the inventive concepts are not limited thereto, with the same or similar elements are denoted by the same or similar reference numerals.

Through the operation of the conventional multiplexer circuit, in the first phase period PHS1 of the horizontal scanning period Scn1, the panel voltage VP1 provided by the amplifier AMP1 of the data channel DCH1 and the panel voltage VP3 provided by the amplifier AMP3 of the data channel DCH3 correspond to the maximum gray scale value Gmax; the panel voltage VP2 provided by the amplifier AMP2 of the data channel DCH2 and the panel voltage VP4 provided by the amplifier AMP4 of the data channel DCH4 correspond to the minimum gray scale value G0.

In the second phase period PHS2 of the horizontal scanning period Scn1, the panel voltage VP1 provided by the amplifier AMP1 of the data channel DCH1, the panel voltage VP2 provided by the amplifier AMP2 of the data channel DCH2, the panel voltage VP3 provided by the amplifier AMP3 of the data channel DCH3, and the panel voltage VP4 provided by the amplifier AMP4 of the data channel DCH4 correspond to the minimum gray scale value G0.

In the first phase period PHS1 of the horizontal scanning period Scn2, the panel voltage VP2 provided by the amplifier AMP2 of the data channel DCH2 and the panel voltage VP4 provided by the amplifier AMP4 of the data channel DCH4 correspond to the maximum gray scale value Gmax; the panel voltage VP1 provided by the amplifier AMP1 of the data channel DCH1 and the panel voltage VP3 provided by the amplifier AMP3 of the data channel DCH3 continuously correspond to the minimum gray scale value G0.

Based on the above, in a display apparatus configured with a conventional multiplexer circuit, the panel voltages VP1 to VP4 provided by the data channels DCH1 to DCH4 are continuously charged and discharged, resulting in an increase in power consumption; conversely, as shown in FIG. 3B, in the display apparatus 100 configured with the multiplexer circuit MUX of the present disclosure, only the panel voltages VP1 and VP3 provided by the data channels DCH1 and DCH3 will be subjected charging and discharging, reducing the power consumption of the source driver 130 and/or decreasing the heat generated by the source driver 130.

In addition, in the case where the pixel array displays a pure blue picture, since the operations of displaying a blue picture and displaying a red picture are the same or similar, reference can be made to the above description, and related details will not be described again here.

Figure 5A:
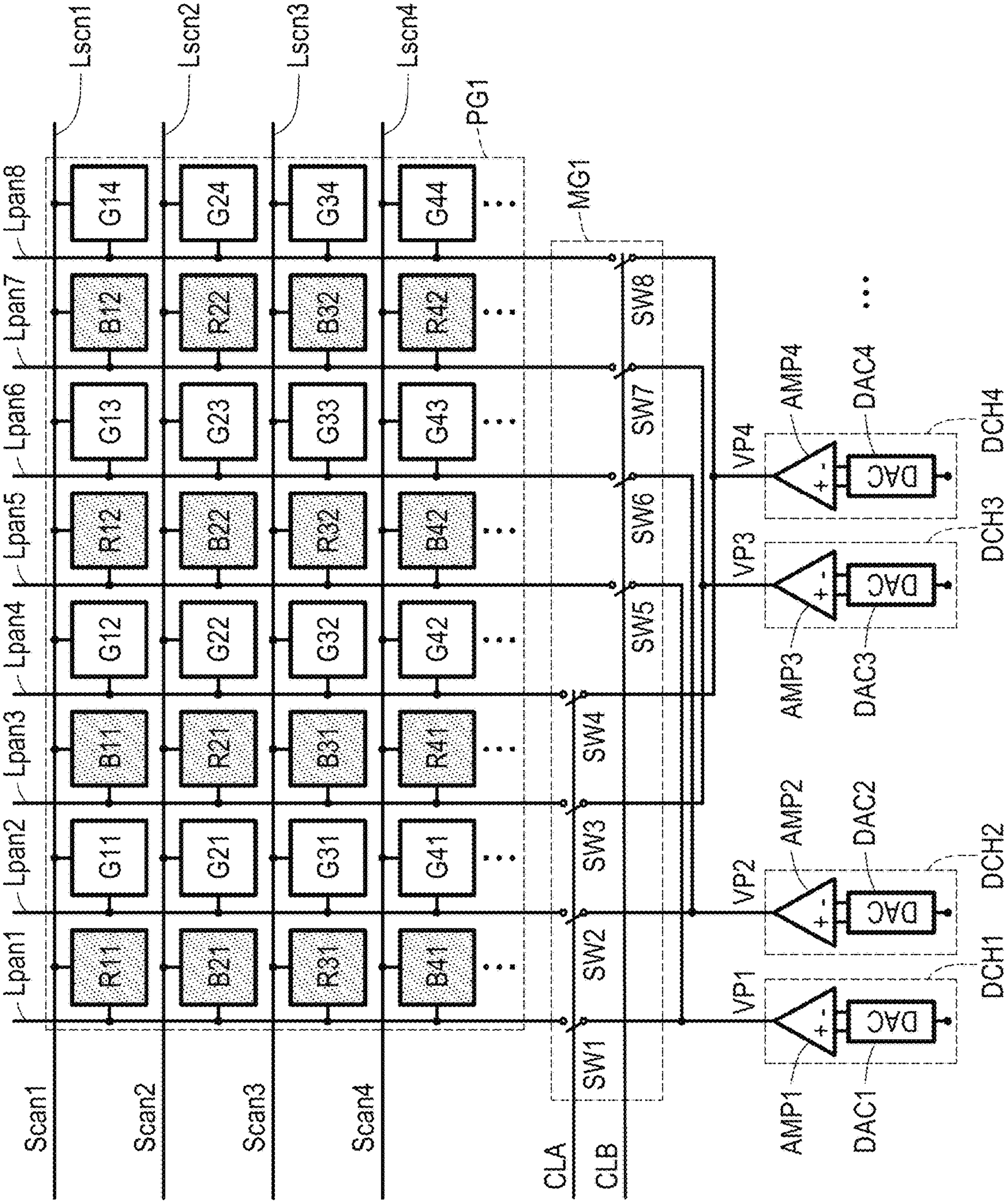
FIG. 5A is a circuit diagram of a pixel array displaying a pure green picture according to some example embodiments of the present disclosure.
Figure 5B:
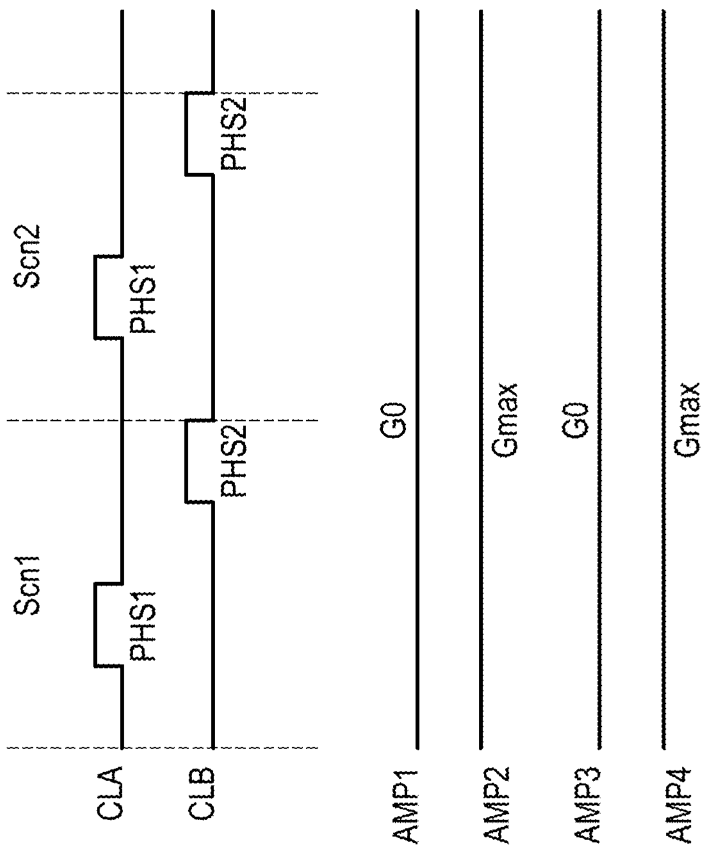
FIG. 5B is a schematic diagram illustrating a driving waveform of a pixel array displaying a pure green picture according to some example embodiments of the present disclosure.

FIG. 5A is a circuit diagram of a pixel array displaying a pure green picture according to some example embodiments of the present disclosure. FIG. 5B is a schematic diagram illustrating a driving waveform of a pixel array displaying a pure green picture according to some example embodiments of the present disclosure. Please refer to FIG. 1A, FIG. 1B, FIG. 5A and FIG. 5B. Only the pixel group PG1, the switch group MG1 and the data channels DCH1 to DCH4 are shown for ease of explanation, however, the inventive concepts are not limited thereto. Identical or similar elements are denoted by the same or similar reference numbers.

In some example embodiments, during the horizontal scanning periods Scn1 and Scn2, the panel voltages VP1 and VP3 provided by the data channels DCH1 and DCH3 (that is, the amplifiers AMP1 and AMP3) responsible for the red pixel circuit (such as R11 to R42) and the blue pixel circuit (such as B11 to B43) continuously correspond to the minimum gray scale value G0, but the panel voltages VP2 and VP4 provided by the data channels DCH2 and DCH4 (that is, the amplifiers AMP2 and AMP4) responsible for the green pixel circuit (such as G11 to G44) continuously correspond to the maximum gray scale value Gmax. In other words, all data channels DCH1 to DCH4 may maintain the same or substantially the same voltage level output (that is, output direct current) to avoid or reduce any AC power consumption.

Figure 6A:
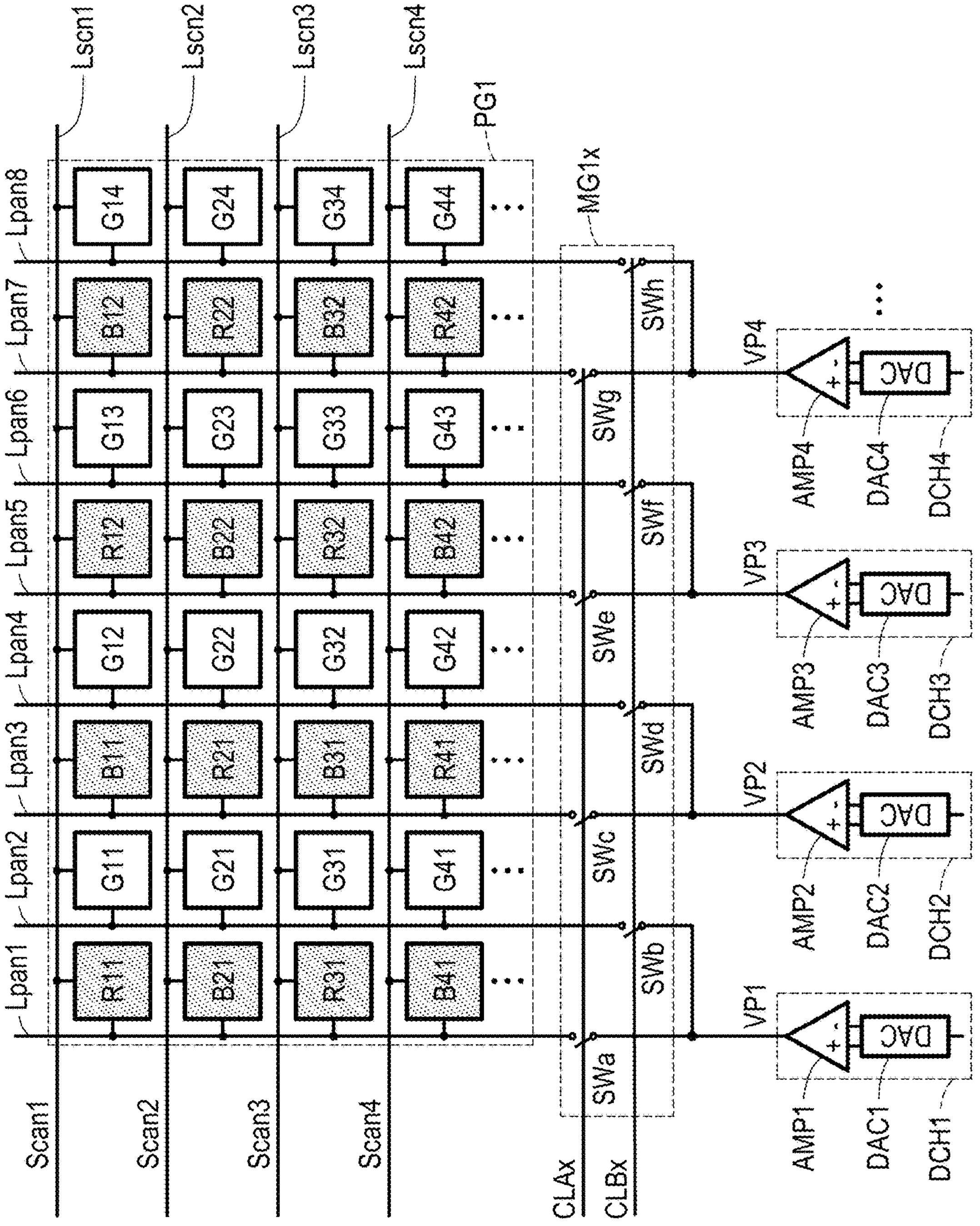
FIG. 6A (PRIOR ART)
FIG. 6A is a circuit diagram of a conventional multiplexer circuit that displays a pure green picture in a pixel array.
Figure 6B:
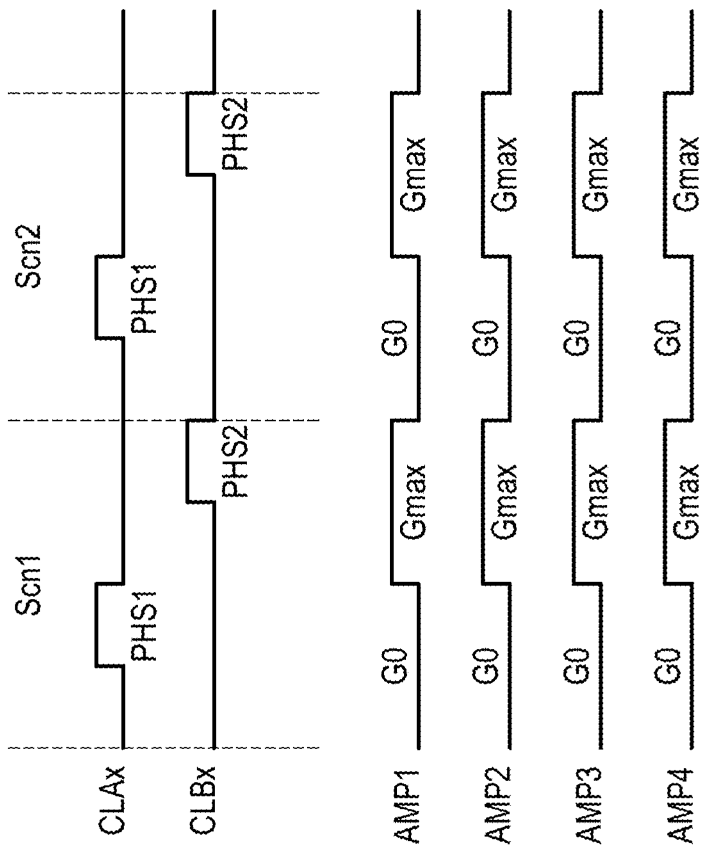
FIG. 6B (PRIOR ART)
FIG. 6B is a schematic diagram illustrating a driving waveform of a conventional multiplexer circuit that displays a pure green picture in a pixel array.

FIG. 6A is a circuit diagram of a conventional multiplexer circuit that displays a pure green picture in a pixel array. FIG. 6B is a schematic diagram illustrating a driving waveform of a conventional multiplexer circuit that displays a pure green picture in a pixel array. Please refer to FIG. 1A, FIG. 1B, FIG. 2A, FIG. 2B, FIG. 5A, FIG. 5B, FIG. 6A and FIG. 6B. Only the pixel group PG1, the switch group MG1*x* and the data channels DCH1 to DCH4 are shown for ease of explanation. However, the inventive concepts are not limited thereto, with the same or similar elements are denoted by the same or similar reference numerals.

In the first phase period PHS1 of the horizontal scanning periods Scn1 and Scn2, the panel voltages VP1 to VP4 provided by the data channels DCH1 to DCH4 (that is, the amplifiers AMP1 to AMP4) correspond to the minimum gray scale value G0. In the second phase period PHS1 of the horizontal scanning periods Scn1 and Scn2, the panel voltages VP1 to VP4 provided by the data channels DCH1 to DCH4 (that is, the amplifiers AMP1 to AMP4) correspond to the maximum gray scale value Gmax. That is to say, in a display apparatus configured with a conventional multiplexer circuit, the panel voltages VP1 to VP4 provided by the data channels DCH1 to DCH4 are constantly charged and discharged, resulting in an increase in power consumption.

Figure 7A:
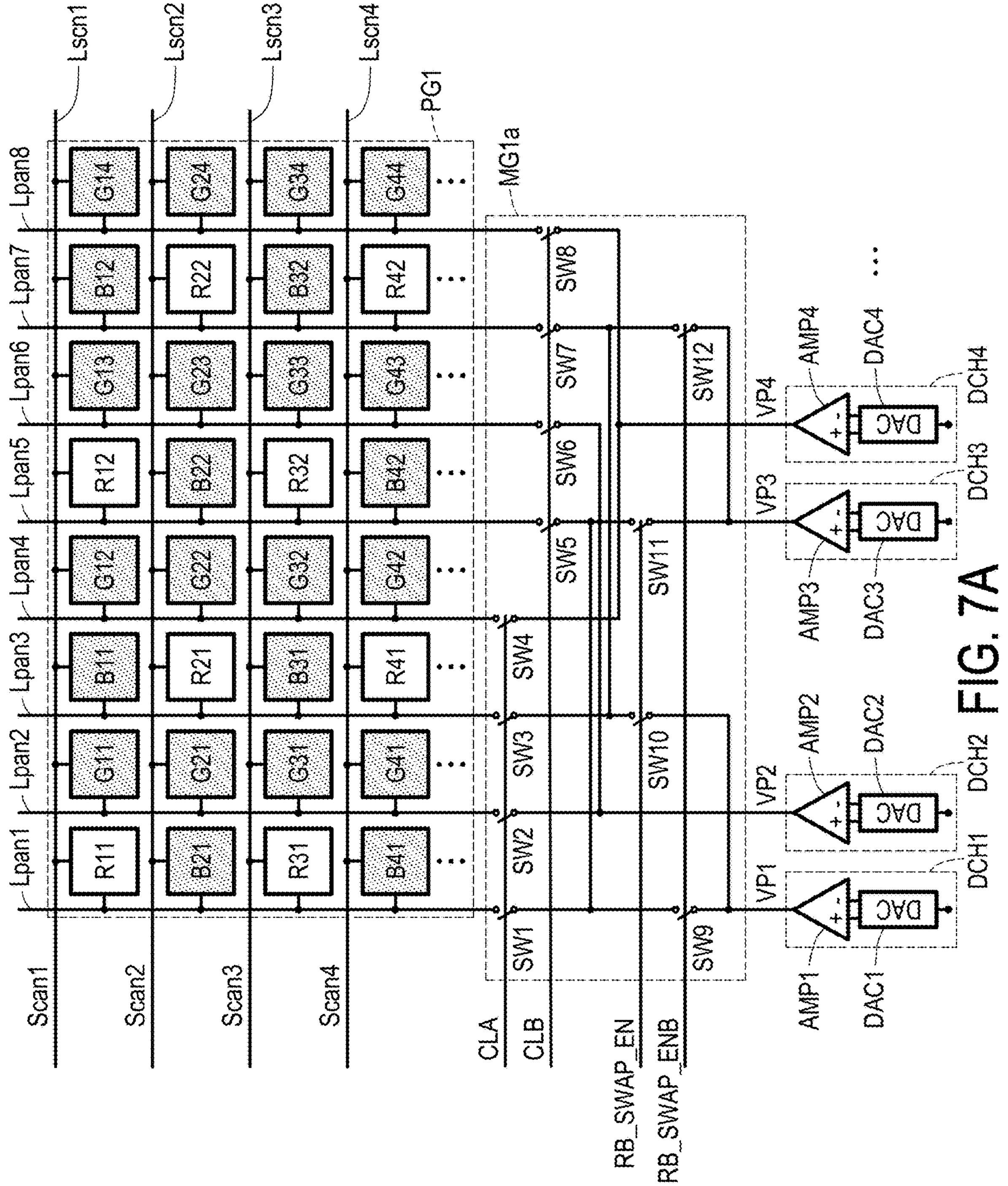
FIG. 7A is a circuit diagram of a multiplexer circuit displaying a pure red picture in a pixel array according to some example embodiments of the present disclosure.

FIG. 7A is a circuit diagram of a multiplexer circuit displaying a pure red picture in a pixel array according to some example embodiments of the present disclosure. Please refer to FIG. 1A and FIG. 7A. In some example embodiments, the switch groups MG1 and MG2 may be replaced with the switch group MG1*a*, with the same or similar elements are denoted by the same or similar reference numerals. In some example embodiments, the switch group MG1*a* further includes a ninth switch SW9, a tenth switch SW10, an eleventh switch SW11, and a twelfth switch SW12. The ninth switch SW9 is coupled between the output terminal of the data channel DCH1 and the first switch SW1 and the fifth switch SW5. The tenth switch SW10 is coupled between the output terminal of the data channel DCH1 and the third switch SW3 and the seventh switch SW7. The eleventh switch SW11 is coupled between the output terminal of the data channel DCH3 and the first switch SW1 and the fifth switch SW5. The twelfth switch SW12 is coupled between the output terminal of the third data channel DCH3 and the third switch SW3 and the seventh switch SW7.

In some example embodiments, the tenth switch SW10 and the eleventh switch SW11 receive (e.g., are controlled by) the swap enable signal RB_SWAP_EN, and the ninth switch SW10 and the twelfth switch SW11 receive (e.g., are controlled by) the swap disable signal RB_SWAP_ENB.

Figure 7B:
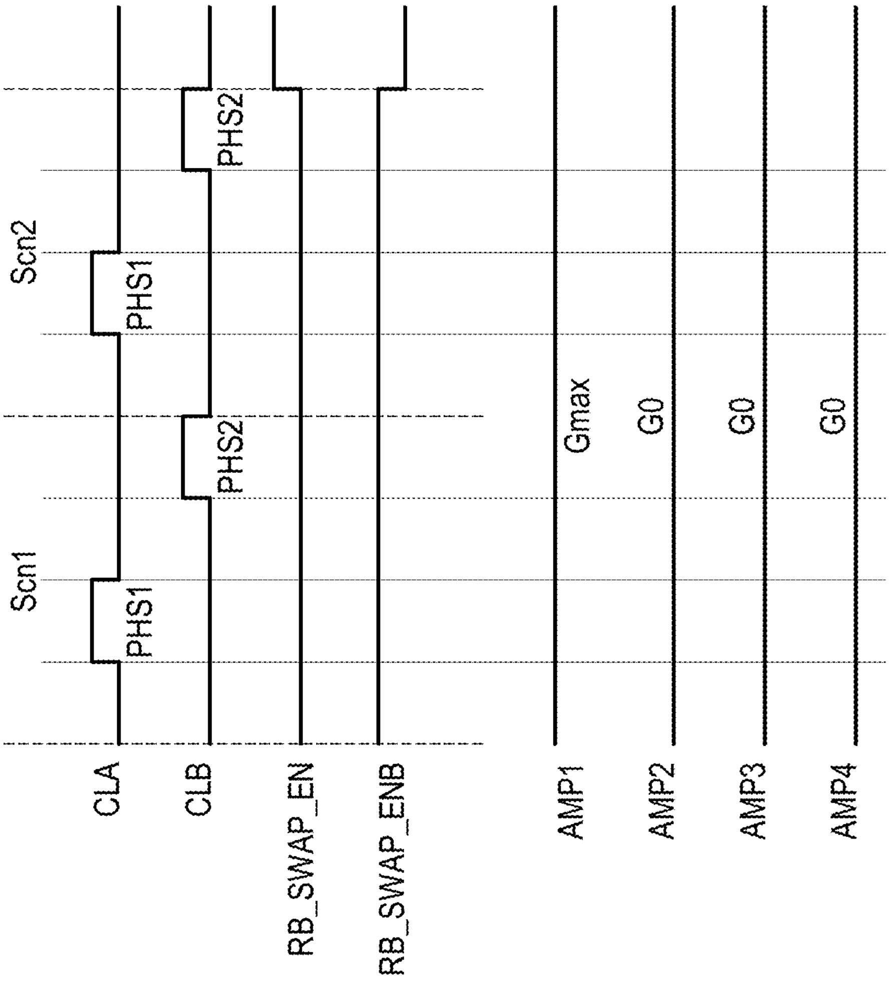
FIG. 7B is a schematic diagram illustrating a driving waveform of a multiplexer circuit displaying a pure red picture in a pixel array according to yet some example embodiments of the present disclosure.

FIG. 7B is a schematic diagram illustrating a driving waveform of a multiplexer circuit displaying a pure red picture in a pixel array according to yet some example embodiments of the present disclosure. Please refer to FIG. 1A, FIG. 1B, FIG. 3A, FIG. 3B, FIG. 7A and FIG. 7B. Only the pixel group PG1, the switch group MG1*a* and the data channels DCH1 to DCH4 are shown for ease of explanation. However, the inventive concepts are not limited thereto. In some example embodiments, the swap disable signal RB_SWAP_ENB is enabled (e.g., turned on) during the entire horizontal scanning period Scn1 (corresponding to the previous first horizontal scanning period), and the swap enable signal RB_SWAP_EN is enabled (e.g., turned on) during the entire horizontal scanning period Scn2 (corresponding to the subsequent second horizontal scanning period), and so on for subsequent cycles.

In some example embodiments, the first switch SW1, the second switch SW2, the third switch SW3 and the fourth switch SW4 are turned on during the first phase period PHS1 of the horizontal scanning periods Scn1 and Scn2, and the fifth switch SW5, the sixth switch SW6, the seventh switch SW7 and the eighth switch SW8 are turned on during the second phase period PHS2 that does not overlap with the first phase period PHS1 in the horizontal scanning periods Scn1 and Scn2, and the ninth switch SW9 and the twelfth switch SW12 are turned on during the horizontal scanning period Scn1, the tenth switch SW10 and the eleventh switch SW11 are turned on during the horizontal scanning period Scn2.

As shown in FIG. 3B, when a pure red picture is displayed, the data channels DCH1 and DCH3 are still subjected to a charge and discharge cycle every two horizontal scanning periods (such as Scn1 and Scn2). In order to further reduce power consumption, four switches (namely, the ninth switch SW9, the tenth switch SW10, the eleventh switch SW11, and the twelfth switch SW12) are added to the switch group MG1*a* in FIG. 7A and controlled by the swap enable signal RB_SWAP_EN and the swap disable signal RB_SWAP_ENB. During the horizontal scanning period Scn1 (that is, the first scanning line), the swap disable signal RB_SWAP_ENB is enabled, and the swap enable signal RB_SWAP_EN is disabled, so that the operation of the switch group MG1*a* is the same or similar as that of the switch group MG1.

In the horizontal scanning period Scn2 (the second scanning line), the swap enable signal RB_SWAP_EN is enabled, and the swap disable signal RB_SWAP_ENB is disabled, so that the data channel DCH1 no longer charges the blue color pixel circuit B21 coupled to the panel trace Lpan1, but charges the red pixel circuit R21 coupled to the panel trace Lpan3 during the first phase period PHS1, and then charges the red pixel circuit R22 coupled to the panel trace Lpan7 during the second phase period PHS2. Because the data channel DCH1 only needs to charge the red pixel circuit (such as R11 to R42), the panel voltage VP1 provided by the data channel DCH1 may continuously correspond to the maximum gray scale value Gmax. For the data channels DCH2 to DCH4 (that is, the amplifiers AMP2, AMP3 and AMP4), the provided panel voltages VP2 to VP3 are maintained at the corresponding minimum gray scale value G0. As such, in some example embodiments, the amplifiers AMP1, AMP2, AMP3 and AMP4 are kept at the same or substantially the same voltage level (e.g. output direct current) to avoid any AC power consumption.

Figure 8A:
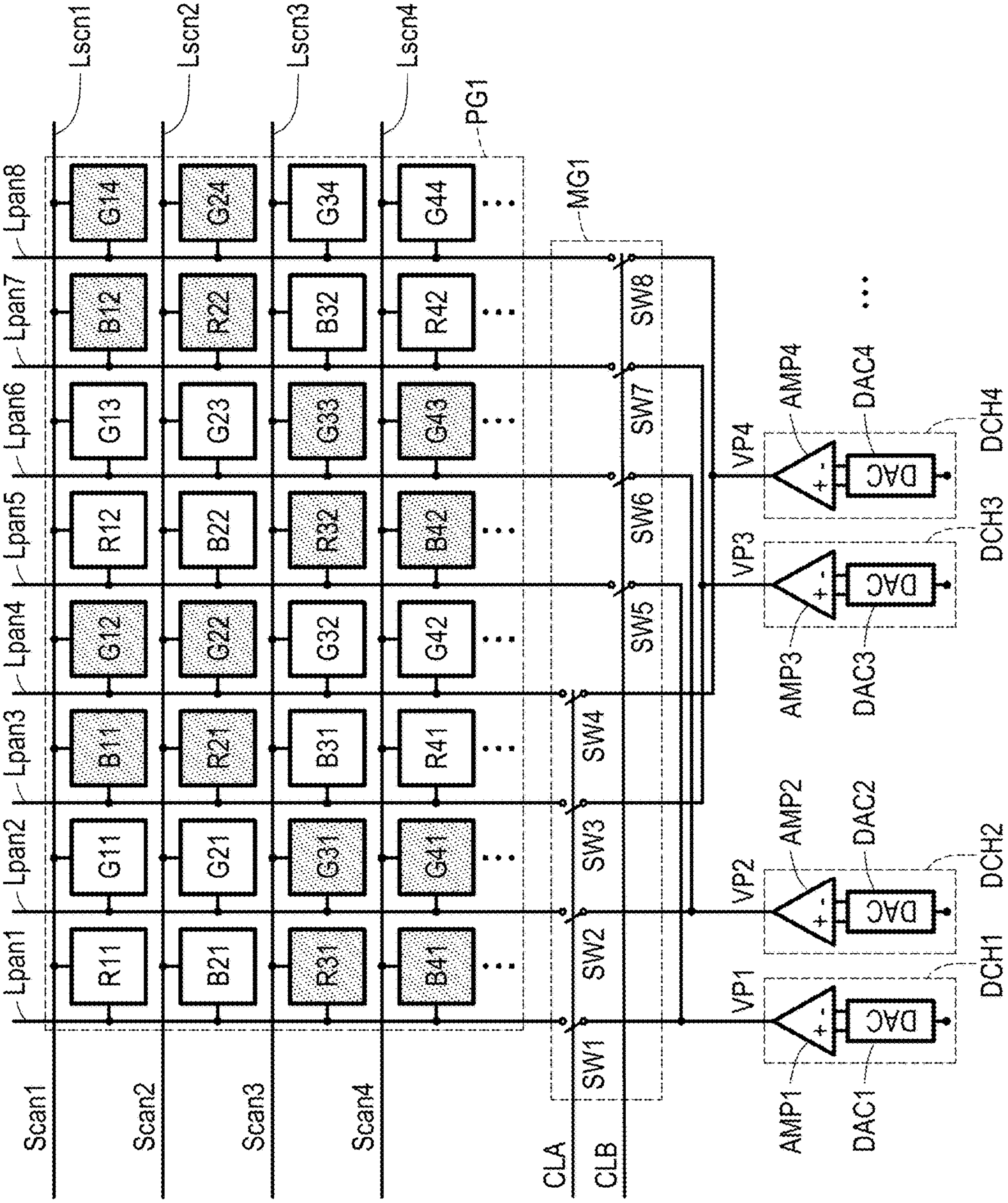
FIG. 8A is a circuit diagram of a pixel array displaying a 1×1 mosaic picture according to some example embodiments of the present disclosure.
Figure 8B:
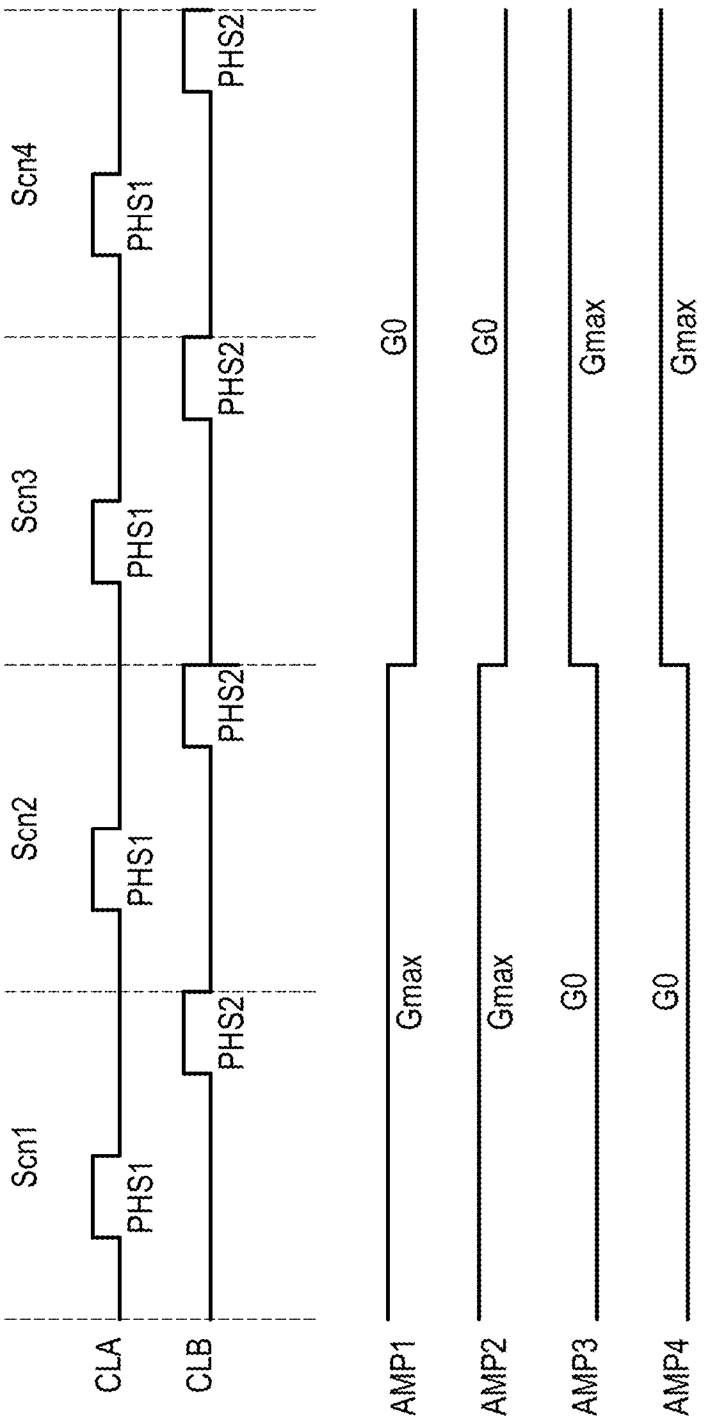
FIG. 8B is a schematic diagram illustrating a driving waveform of a pixel array displaying a 1×1 mosaic picture according to some example embodiments of the present disclosure.

FIG. 8A is a circuit diagram of a pixel array displaying a 1×1 mosaic picture according to some example embodiments of the present disclosure. FIG. 8B is a schematic diagram illustrating a driving waveform of a pixel array displaying a 1×1 mosaic picture according to some example embodiments of the present disclosure. Please refer to FIG. 1A, FIG. 1B, FIG. 3A, FIG. 3B, FIG. 8A and FIG. 8B. Only the pixel group PG1, the switch group MG1*a* and the data channels DCH1 to DCH4 are shown for ease of explanation. However, the inventive concepts are not limited thereto, with the same or similar elements are denoted by the same or similar reference numerals.

In some example embodiments, the pixel group PG1 may also display other common test patterns, such as a 1×1 mosaic picture. For the switch group MG1, during the horizontal scanning periods Scn1 and Scn2, the panel voltages VP1 and VP2 provided by the data channels DCH1 and DCH2 (that is, the amplifiers AMP1 and AMP2) correspond to the maximum gray scale value Gmax, and the panel voltages VP3 and VP4 provided by the data channels DCH3 and DCH4 (that is, the amplifiers AMP3 and AMP4) correspond to the minimum gray scale value G0.

During the horizontal scanning periods Scn3 and Scn4, the panel voltages VP1 and VP2 provided by the data channels DCH1 and DCH2 (that is, the amplifiers AMP1 and AMP2) correspond to the minimum gray scale value G0, and the panel voltages VP3 and VP4 provided by the data channels DCH3 and DCH4 (that is, the amplifiers AMP3 and AMP4) correspond to the maximum gray scale value Gmax.

Based on the above, the data channels DCH1 to DCH4 are still subjected to a charge and discharge cycle every 4 horizontal scanning periods (such as Scn1 to Scn4).

Figure 9A:
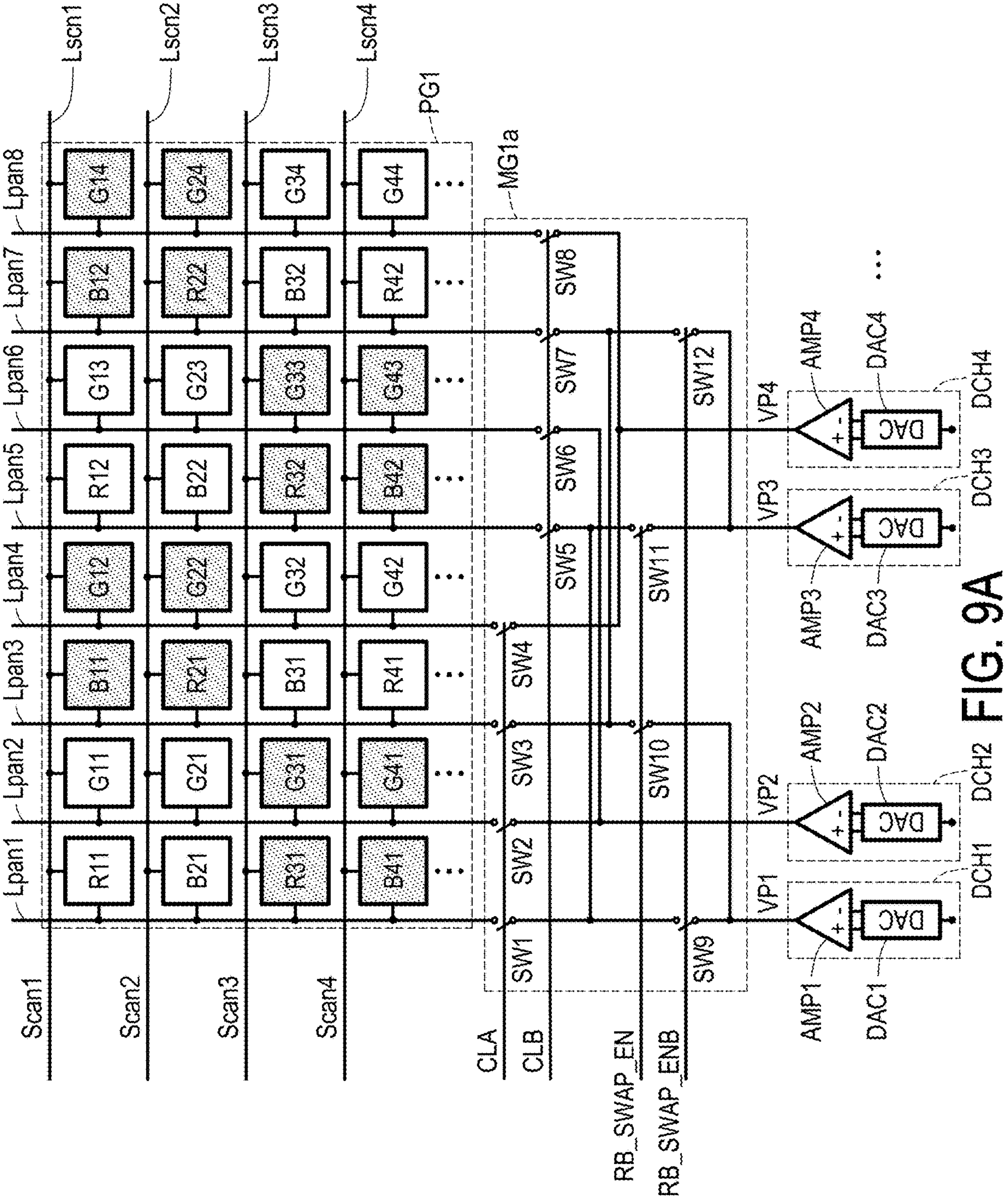
FIG. 9A is a circuit diagram of a pixel array displaying a 1×1 mosaic picture according to some example embodiments of the present disclosure.
Figure 9B:
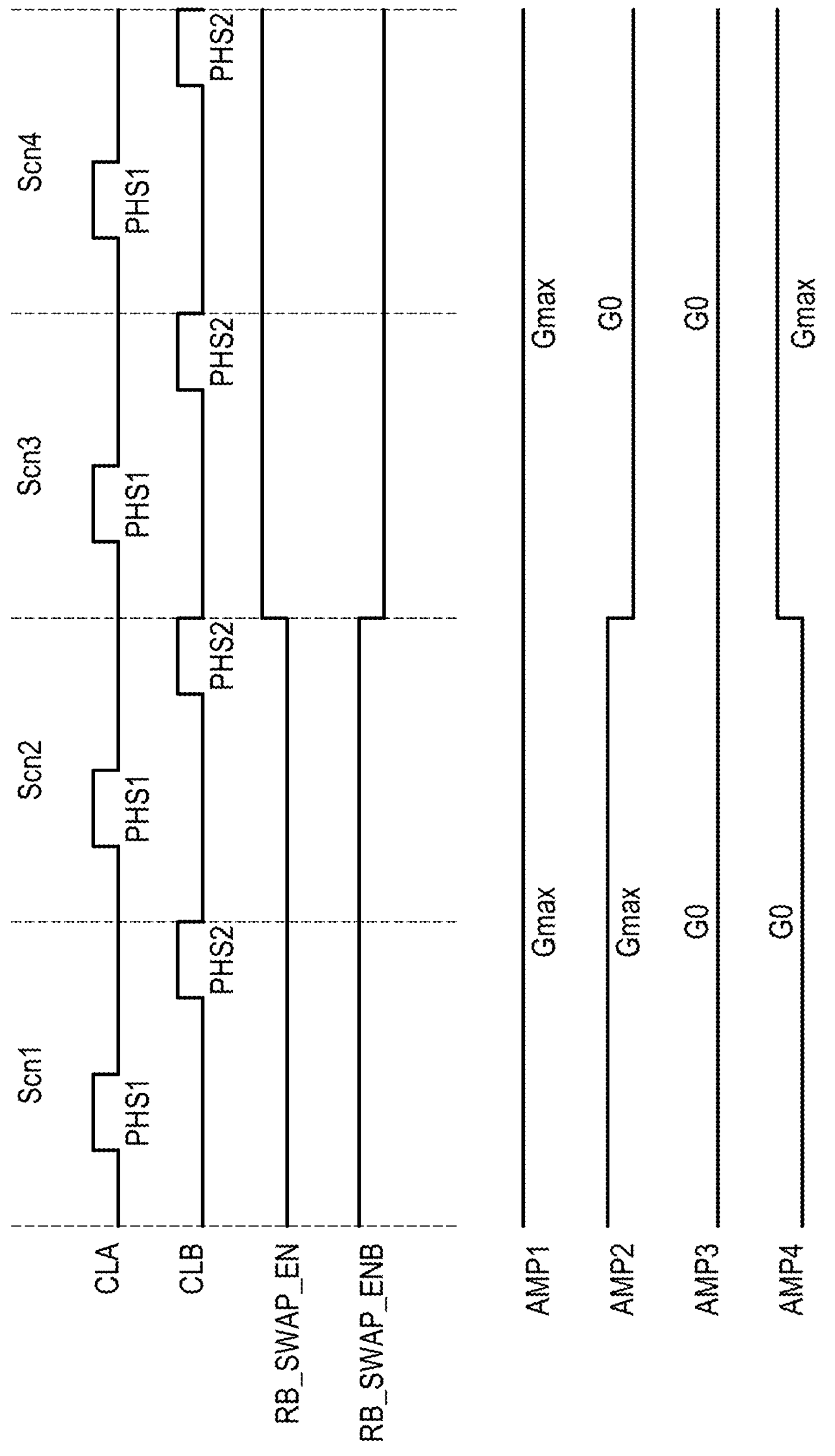
FIG. 9B is a schematic diagram illustrating a driving waveform of a pixel array displaying a 1×1 mosaic picture according to some example embodiments of the present disclosure.

FIG. 9A is a circuit diagram of a pixel array displaying a 1×1 mosaic picture according to some example embodiments of the present disclosure. FIG. 9B is a schematic diagram illustrating a driving waveform of a pixel array displaying a 1×1 mosaic picture according to some example embodiments of the present disclosure. Please refer to FIG. 1A, FIG. 1B, FIG. 7A and FIG. 7B, FIG. 9A and FIG. 9B. Only the pixel group PG1, the switch group MG1*a* and the data channels DCH1 to DCH4 are shown for ease of explanation. However, the inventive concepts are not limited thereto, with the same or similar elements are denoted by the same or similar reference numerals.

In some example embodiments, the swap disable signal RB_SWAP_ENB is enabled (that is, turned on) during the entire horizontal scanning periods Scn1 and Scn2 (corresponding to the subsequent first horizontal scanning period and the second horizontal scanning period), and the swap enable signal RB_SWAP_EN is enabled (that is, turned on) during the entire horizontal scanning periods Scn3 and Scn4 (corresponding to the subsequent second horizontal scanning period and the fourth horizontal scanning period), and so on in subsequent cycles.

In some example embodiments, the first switch SW1, the second switch SW2, the third switch SW3 and the fourth switch SW4 are turned on during the first phase period PHS1 of the sequential horizontal scanning periods Scn1 to Scn4, and the fifth switch SW5, the sixth switch SW6, the seventh switch SW7 and the eighth switch SW8 are turned on during the second phase period PHS2 that does not overlap with the first phase period PHS1 in the horizontal scanning periods Scn1 to Scn4; the ninth switch SW9 and the twelfth switch SW12 are turned on during the horizontal scanning periods Scn1 and Scn2, and the tenth switch SW10 and the eleventh switch SW11 are turned on during the horizontal scanning periods Scn3 and Scn4.

As shown in FIG. 9B, the panel voltage VP1 provided by the data channel DCH1 (that is, the amplifier AMP1) continuously corresponds to the maximum gray scale value Gmax, and the panel voltage VP3 provided by the data channel DCH3 (that is, the amplifier AMP3) continuously corresponds to the minimum gray scale value G0. Moreover, the panel voltage VP1 provided by the data channel DCH2 (that is, the amplifier AMP2) corresponds to the maximum gray scale value Gmax during the horizontal scanning periods Scn1 and Scn2 and corresponds to the minimum gray scale value G0 during the horizontal scanning periods Scn3 and Scn4, and the panel voltage VP3 provided by the data channel DCH3 (e.g., the amplifier AMP3) corresponds to the minimum gray scale value G0 during the horizontal scanning periods Scn1 and Scn2 and corresponds to the maximum gray scale value Gmax during the horizontal scanning periods Scn3 and Scn4. In other words, both data channels DCH1 and DCH3 may maintain the same or substantially the same voltage level output (that is, output direct current) to avoid any AC power consumption.

Figure 10A:
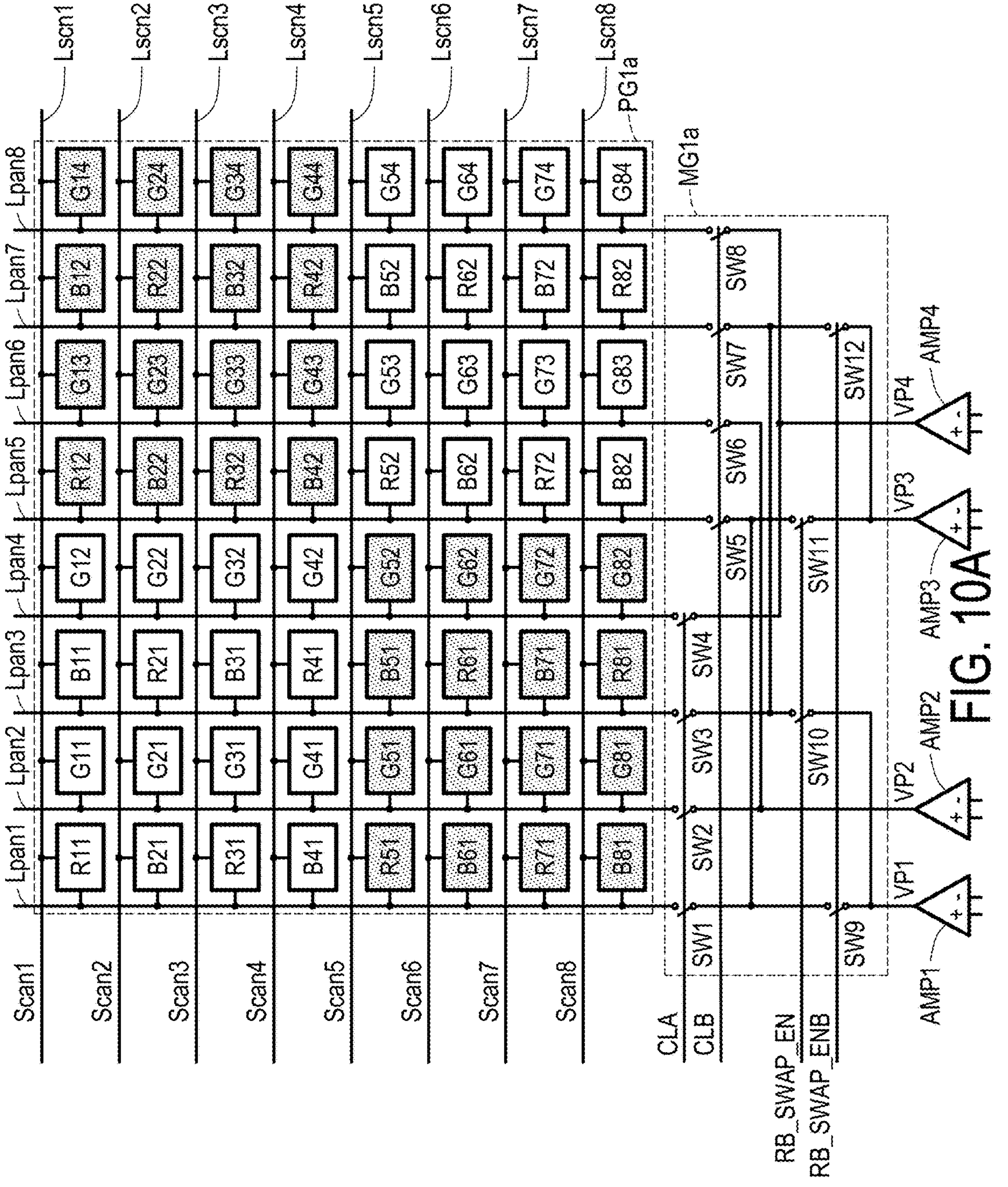
FIG. 10A is a circuit diagram of a pixel array displaying a 2×2 mosaic picture according to some example embodiments of the present disclosure.
Figure 10B:
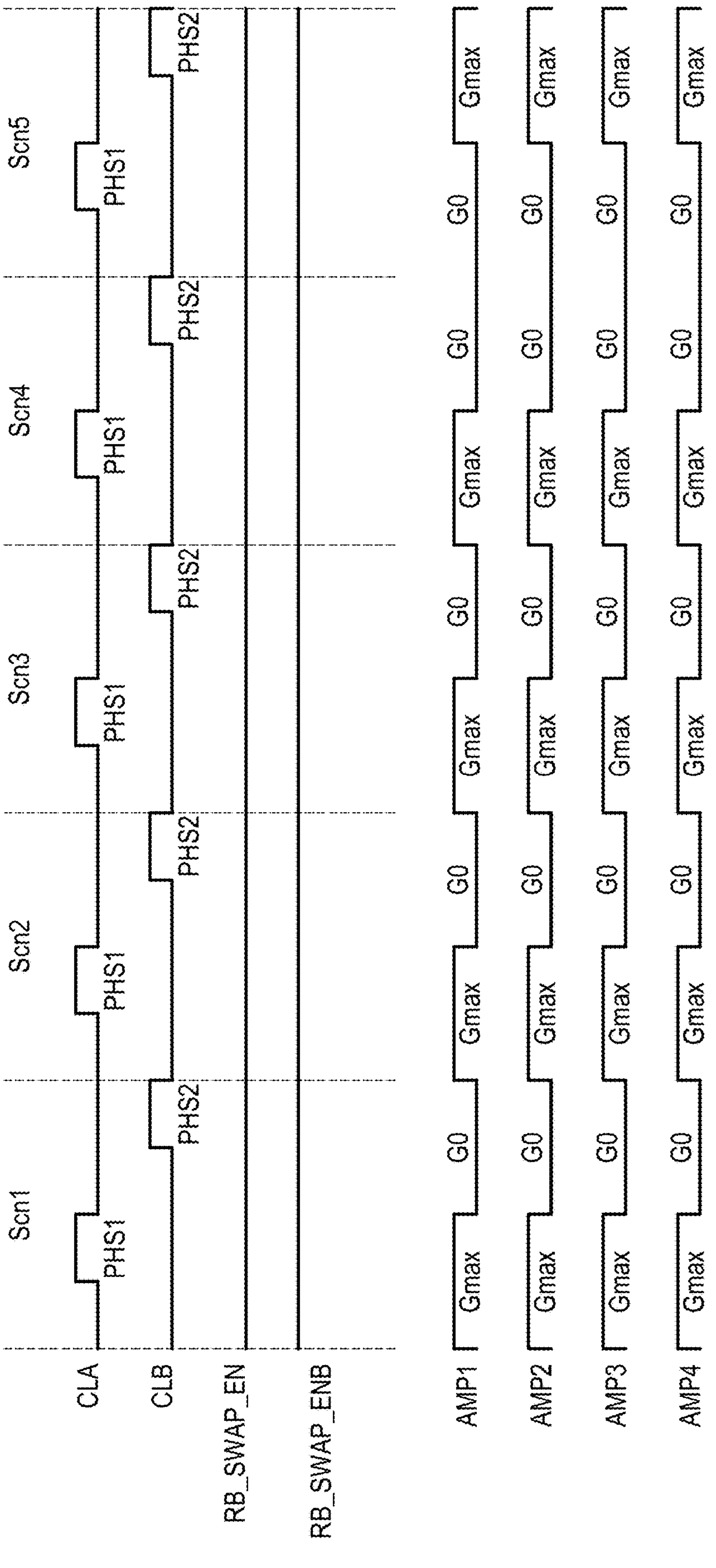
FIG. 10B is a schematic diagram illustrating a driving waveform of a pixel array displaying a 2×2 mosaic picture according to some example embodiments of the present disclosure.

FIG. 10A is a circuit diagram of a pixel array displaying a 2×2 mosaic picture according to some example embodiments of the present disclosure. FIG. 10B is a schematic diagram illustrating a driving waveform of a pixel array displaying a 2×2 mosaic picture according to some example embodiments of the present disclosure. Please refer to FIG. 1A, FIG. 1B, FIG. 7A and FIG. 7B, FIG. 10A and FIG. 10B. Only the amplifiers AMP1 to AMP4 in the pixel group PG1*a*, the switch group MG1*a* and the data channels DCH1 to DCH4 are shown for ease of explanation. However, the inventive concepts are not limited thereto, with the same or similar elements are denoted by the same or similar reference numerals. The pixel group PG1*a* shows an 8×8 array of pixel circuits, which includes a plurality of red pixel circuits (such as R11 to R13, R21 to R22, R31 to R33, R41 to R42, R51 to R53, R61 to R62, R71 to R73, R81 to R82), a plurality of blue pixel circuits (such as B11 to B12, B21 to B23, B31 to B32, B41 to B43, B51 to B52, B61 to B63, B71 to B72, B81 to B83), and a plurality of green pixel circuits (such as G11 to G14, G21 to G24, G31 to G34, G41 to G44, G51 to G54, G51 to G54, G51 to G54, G51 to G54), with the pixel circuits in the pixel group PG1*a* are driven row by row through the scan traces (such as Lscn1 to Lscn8) that receive the corresponding scan signals (such as Scan1 to Scan8), and receive the panel voltages VP1 to VP4 through the panel traces (such as Lpan1 to Lpan9).

In some example embodiments, the pixel group PG1*a* may also display other common test patterns, such as a 2×2 mosaic picture. The swap disable signal RB_SWAP_ENB is enabled (that is, turned on) during all horizontal scanning periods Scn1 to Scn5, and the swap enable signal RB_SWAP_EN is disabled (that is, turned off) during all horizontal scanning periods Scn1 to Scn5, and so on in the subsequent cycles.

As such, in some example embodiments, the first switch SW1, the second switch SW2, the third switch SW3 and the fourth switch SW4 are turned on in the first phase period PHS1 of the horizontal scanning periods Scn1 to Scn5, the fifth switch SW5, the sixth switch SW6, the seventh switch SW7 and the eighth switch SW8 are turned on during the second phase period PHS2 that does not overlap with the first phase period PHS1 in the horizontal scanning periods Scn1 to Scn5, the ninth switch SW9 and the twelfth switch SW12 are always turned on during the horizontal scanning periods Scn1 to Scn5, and the tenth switch SW10 and the twelfth switch SW12 are always turned off during the horizontal scanning periods Scn1 to Scn5.

For the switch group MG1*a*, in the horizontal scanning periods Scn1 to Scn5, the panel voltages VP1 to VP4 provided by the data channels DCH1 to DCH4 (that is, the amplifiers AMP1 to AMP4) correspond to the maximum gray scale value Gmax in the first phase period PHS1, and the panel voltages VP1 to VP4 provided by the data channels DCH1 to DCH4 (that is, the amplifiers AMP1 to AMP4) correspond to the minimum gray scale value G0 during the first phase period PHS2.

As shown in FIG. 10A, because each amplifier AMP1 to AMP4 is connected to the i-th and i+4th panel traces (such as Lpan1 to Lpan9), if the panel data Dpan corresponding to the i-th and i+4th panel traces (such as Lpan1 to Lpan9) are different, switching of voltage levels is inevitable. Therefore, the panel voltages VP1 to VP4 output by all amplifiers AMP1 to AMP4 are switched during each phase period (such as PHS1, PHS2), which results in a lot of power loss.

Figure 11A:
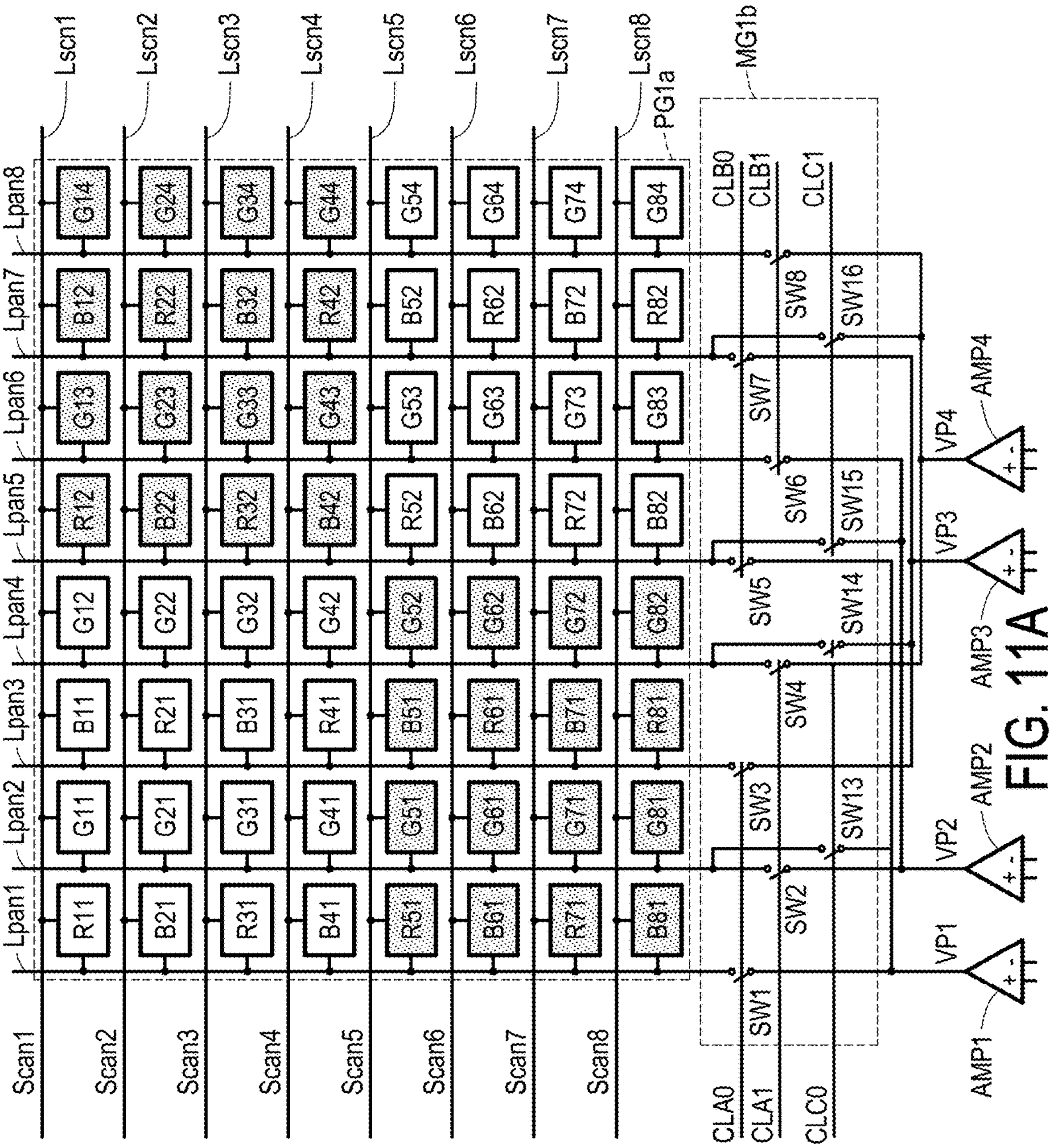
FIG. 11A is a circuit diagram of a multiplexer circuit displaying a 2×2 mosaic picture in a pixel array according to some example embodiments of the present disclosure.

FIG. 11A is a circuit diagram of a multiplexer circuit displaying a 2×2 mosaic picture in a pixel array according to some example embodiments of the present disclosure. Please refer to FIG. 1A and FIG. 11A. In some example embodiments, the switch groups MG1 and MG2 may be replaced with the switch group MG1*b*, with the same or similar elements are denoted by the same or similar reference numbers. In some example embodiments, the switch group MG1*a* further includes a thirteenth switch SW13, a fourteenth switch SW14, a fifteenth switch SW15, and a sixteenth switch SW16.

The thirteenth switch SW13 is coupled between the output terminal of the data channel DCH1 and the panel trace Lpan2. The fourteenth switch SW14 is coupled between the output terminal of the data channel DCH3 and the panel trace Lpan4. The fifteenth switch SW15 is coupled between the output terminal of the data channel DCH2 and the odd-numbered panel trace Lpan5. The sixteenth switch SW16 is coupled between the output terminal of the data channel DCH4 and the panel trace Lpan7.

In some example embodiments, the first switch SW1 and the third switch SW3 receive (that is, are controlled by) the control signal CLA0, the second switch SW2 and the fourth switch SW4 receive (that is, are controlled by) the control signal CLA1, the fifth switch SW5 and the seventh switch SW7 receive (that is, are controlled by) the control signal CLB0, the sixth switch SW6 and the eighth switch SW8 receive (that is, are controlled by) the control signal CLB1, the thirteenth switch SW13 and the fourteenth switch SW14 receives (e.g., are controlled by) the control signal CLC0, and the fifteenth switch SW15 and the sixteenth switch SW16 receive (e.g., are controlled by) the control signal CLC1.

Figure 11B:
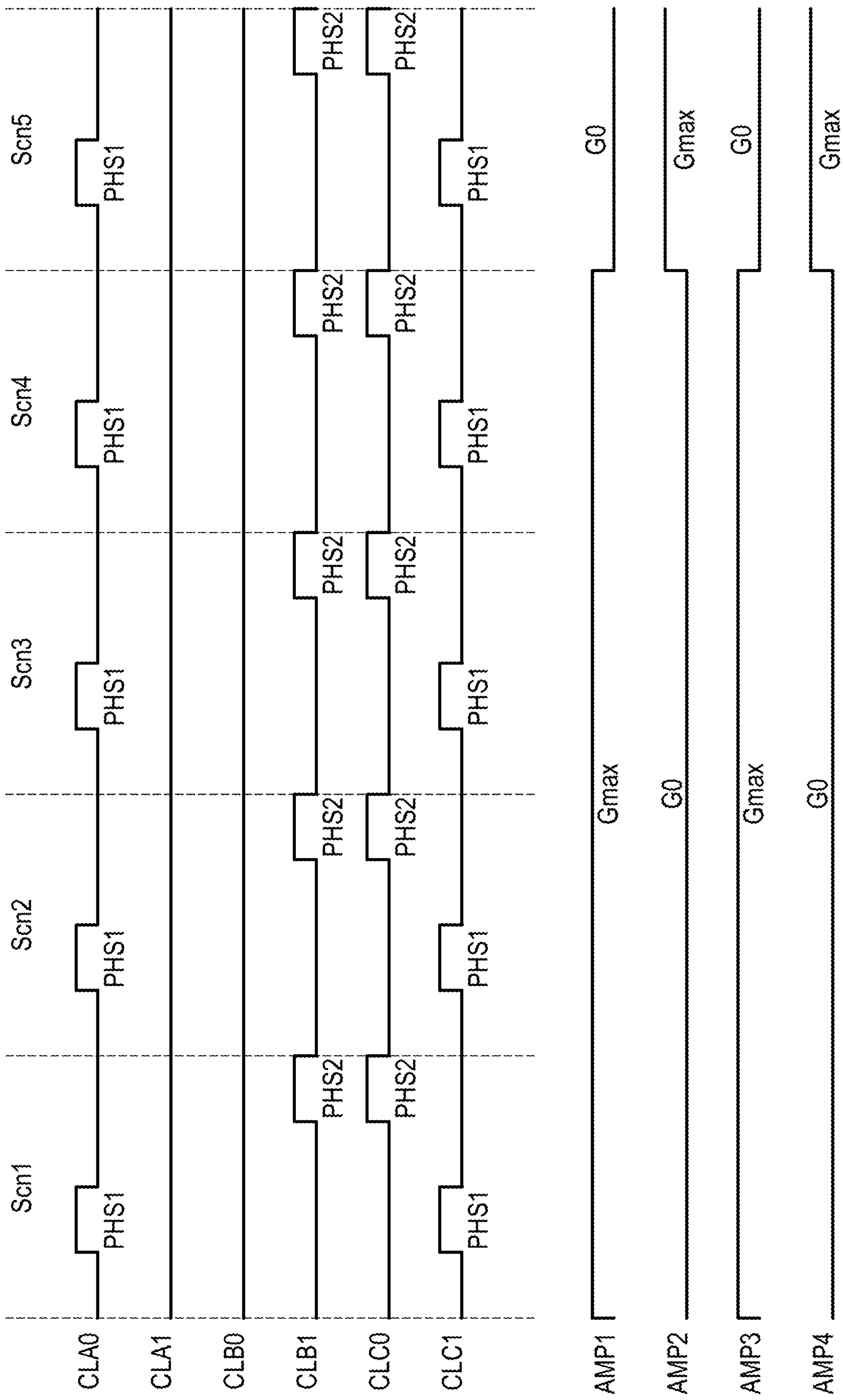
FIG. 11B is a schematic diagram illustrating a driving waveform of a multiplexer circuit displaying a 2×2 mosaic picture in a pixel array according to some example embodiments of the present disclosure.

FIG. 11B is a schematic diagram illustrating a driving waveform of a multiplexer circuit displaying a 2×2 mosaic picture in a pixel array according to some example embodiments of the present disclosure. Please refer to FIG. 1A, FIG. 1B, FIG. 11A and FIG. 11B. Only the amplifiers AMP1 to AMP4 in the pixel group PG1*a*, the switch group MG1*b* and the data channels DCH1 to DCH4 are shown for ease of explanation. However, the inventive concepts are not limited thereto. In some example embodiments, the control signals CLA0 and CLC1 are enabled (that is, turned on) during the first phase period PHS1 of the horizontal scanning periods Scn1 to Scn5, the control signals CLB1 and CLC0 are enabled (that is, turned on) during the second phase period PHS2 of the horizontal scanning periods Scn1 to Scn5, and the control signals CLA1 and CLB0 are disabled (that is, turned off) during the horizontal scanning periods Scn1 to Scn5.

In some example embodiments, the first switch SW1, the third switch SW3, the fifteenth switch SW15 and the sixteenth switch SW16 are turned on during the first phase period PHS1 of the horizontal scanning periods Scn1 to Scn5, the sixth switch SW6, the eighth switch SW8, the thirteenth switch SW13 and the fourteenth switch SW14 are turned on during the second phase period PHS2 that does not overlap with the first phase period PHS1 in the horizontal scanning periods Scn1 to Scn5, and the second switch SW2, the fourth switch SW2, the fifth switch SW5 and the seventh switch SW7 are turned off during the horizontal scanning periods Scn1 to Scn5.

As shown in FIG. 11A, the amplifier AMP1 is connected to the 1st, 2nd, and 5th panel traces Lpan1, Lpan2, and Lpan5 through the first switch SW1, the thirteenth switch SW13, and the fifth switch SW5. The amplifier AMP2 is connected to the 2nd, 5th, and 6th panel traces Lpan2, Lpan5 and Lpan6 through the second switch SW2, the fifteenth switch SW15 and the sixth switch SW6. The amplifier AMP3 is connected to the 3rd, 4th, and 7th panel traces Lpan3, Lpan4, and Lpan7 through the third switch SW3, the fourteenth switch SW14 and the seventh switch SW2. The amplifier AMP4 is connected to the 4th, 7th, and 8th panel traces Lpan3, Lpan4, and Lpan7 through the fourth switch SW4, the sixteenth switch SW16, and the eighth switch SW8. That is, the amplifier (such as AMP1 to AMP4) of each data channel (such as DCH1 to DCH4) is connected to the n-th, n+1-th, and n+4-th panel traces (such as Lpan1 to Lpan8) to obtain the advantageous of the switch group MG1 and the conventional switch group MG1*x*.

Figure 11C:
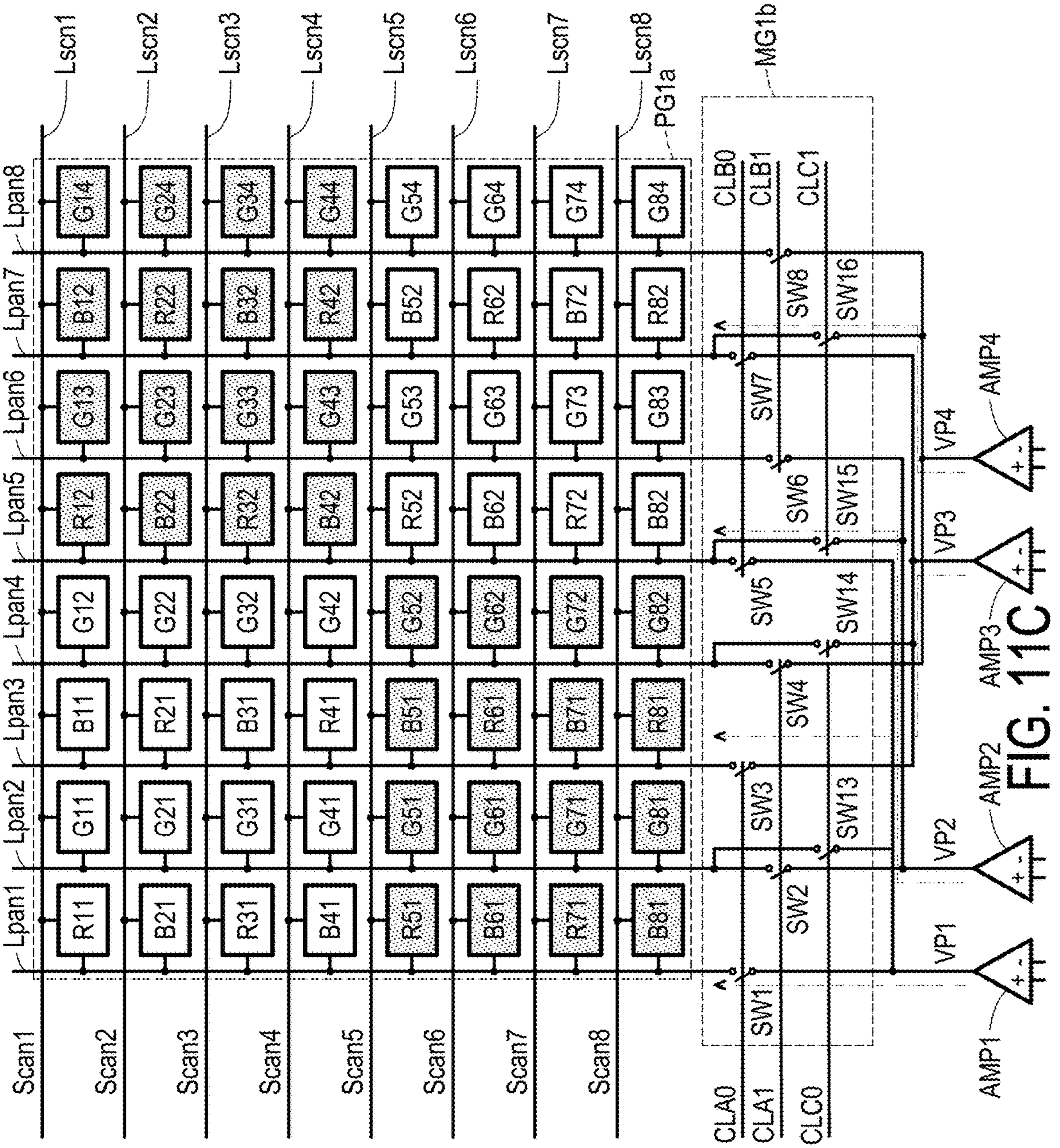
FIG. 11C and FIG. 11D are schematic circuit operation diagrams in which a multiplexer circuit displays a 2×2 mosaic picture in a pixel array according to some example embodiments of the present disclosure.
Figure 11D:
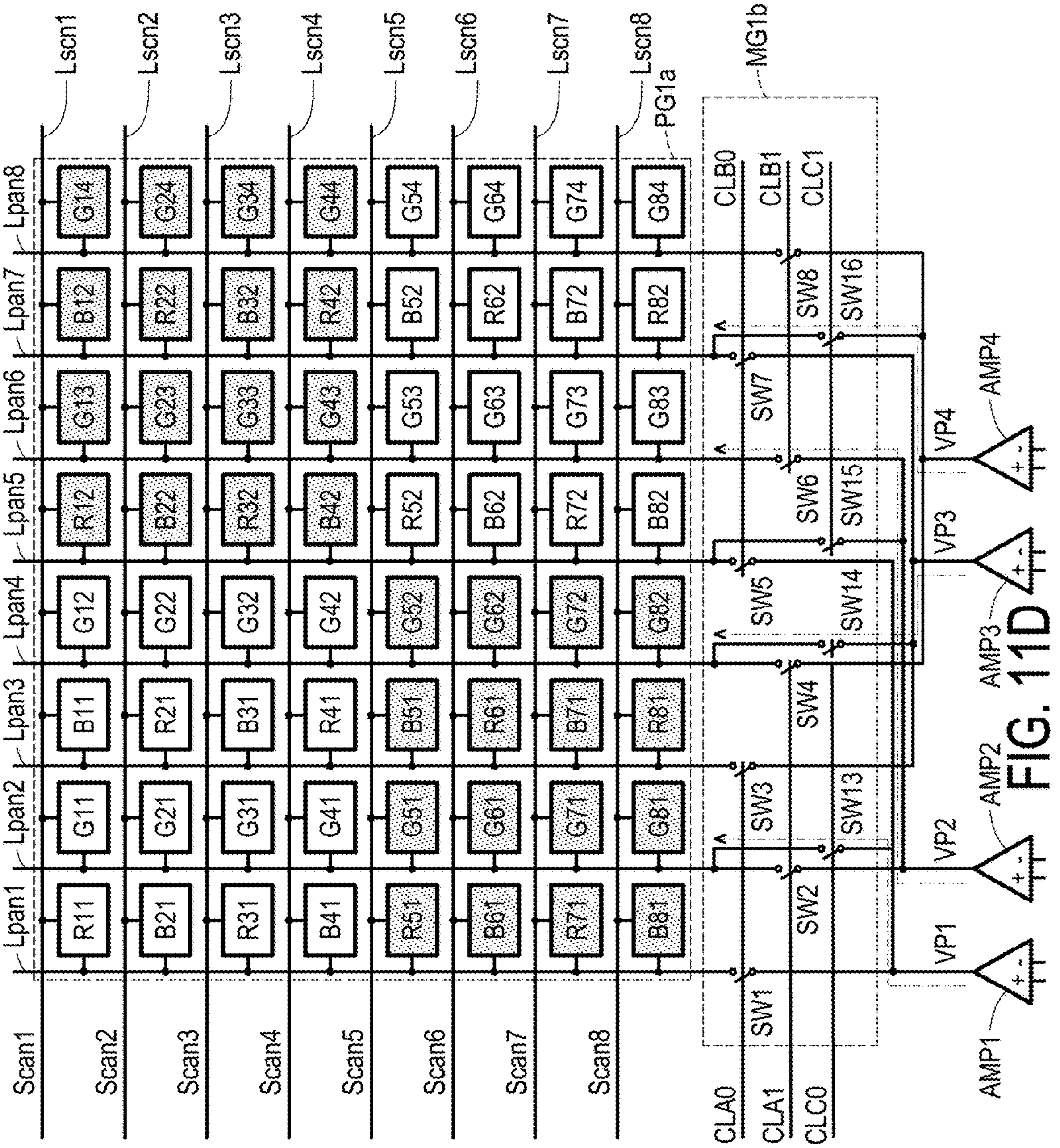

FIG. 11C and FIG. 11D are schematic circuit operation diagrams in which a multiplexer circuit displays a 2×2 mosaic picture in a pixel array according to some example embodiments of the present disclosure. Please refer to FIG. 1A, FIG. 1B, FIG. 11A to FIG. 11D. In some example embodiments, the control signals CLA1 and CLB0 are always turned off. As shown in FIG. 11C, control signals CLA0 and CLC1 are turned on during the first phase period PHS1 to charge the 1st, 3rd, 5th, and 7th panel traces Lpan1, Lpan3, Lpan5, and Lpan7. As shown in FIG. 11D, the control signals CLC0 and CLB1 start to charge the 2nd, 4th, 6th, and 8th panel traces Lpan2, Lpan4, Lpan6, and Lpan8. As shown in FIG. 11B, it can be known that during the horizontal scanning periods Scn1 to Scn4, the amplifiers AMP1 to AMP4 of the data channels DCH1 to DCH4 do not need to switch the voltage level; and the amplifiers AMP1 to AMP4 of the data channels DCH1 to DCH4 are only subjected to one charge and discharge cycle every 8 horizontal scanning periods (such as Scn1 to Scn5), which significantly improves the power consumption of the data channels DCH1 to DCH4 for the 2×2 mosaic picture. For other modes such as pure red picture, pure green picture and pure blue picture, the switch group MG1*b* may switch the same or substantially the same operation as the switch group MG1 by disabling the control signals CLC0 and CLC1, thereby maintaining the same or substantially the same power consumption as before.

Figure 12A:
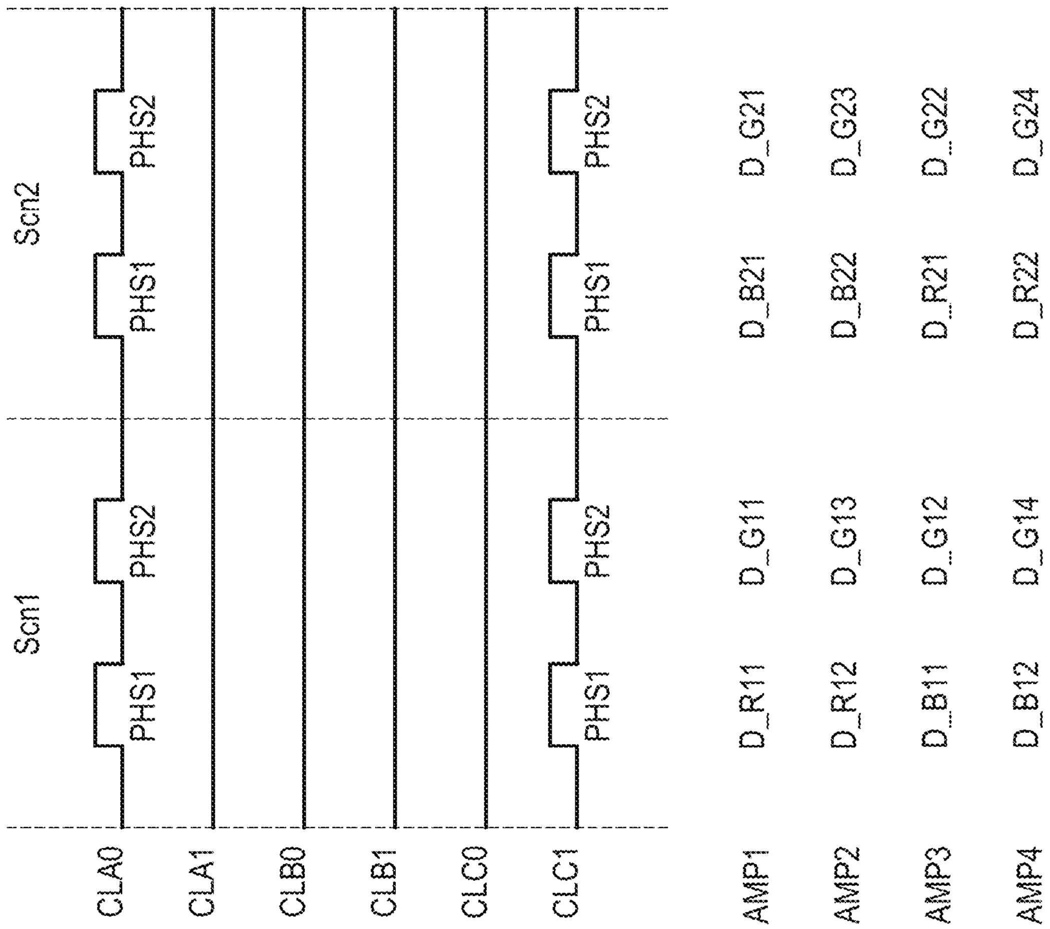
FIG. 12A and FIG. 12B are schematic diagrams illustrating driving waveforms of a multiplexer circuit displaying a 2×2 mosaic picture in a pixel array according to some example embodiments of the present disclosure.
Figure 12B:
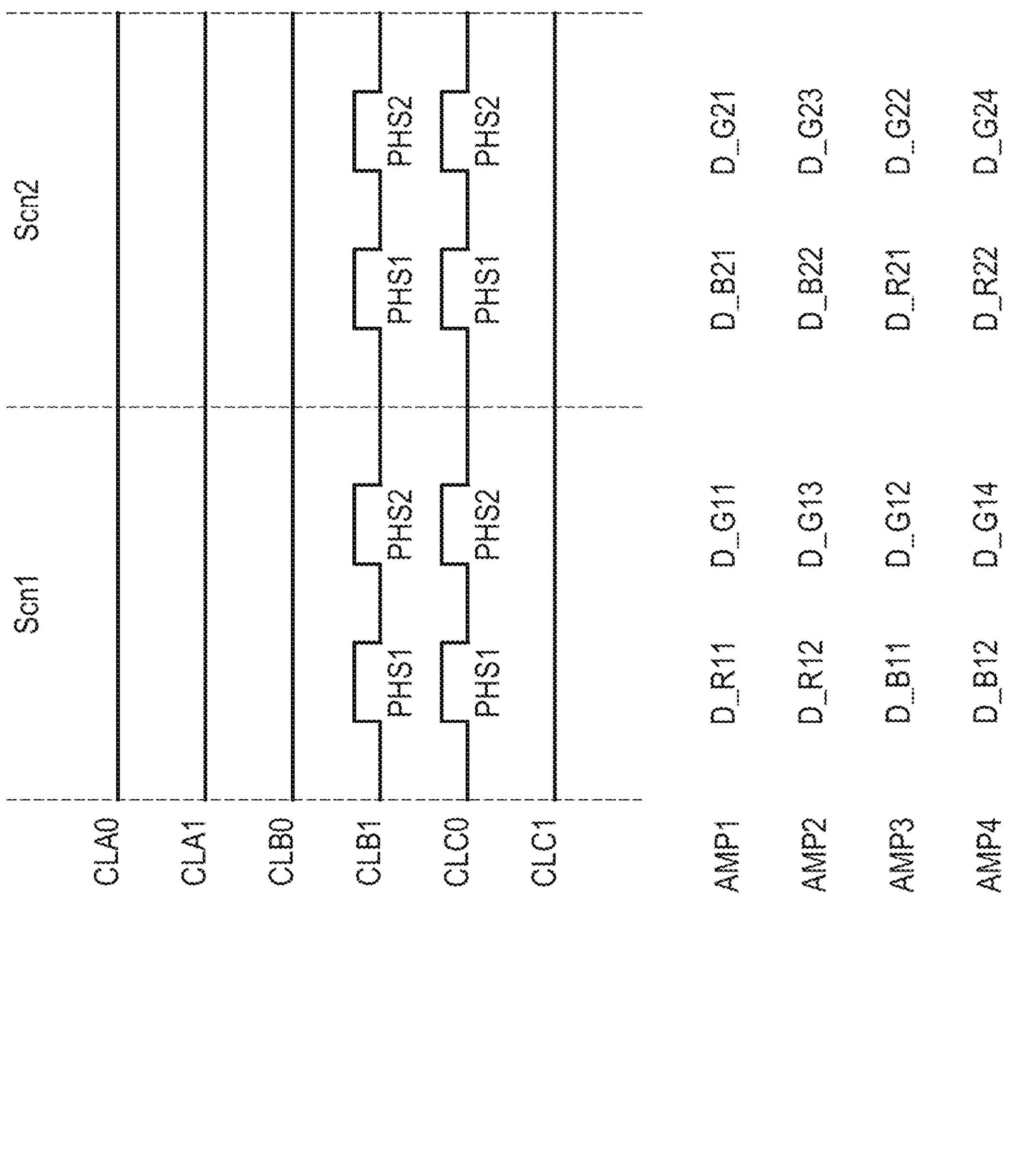

FIG. 12A and FIG. 12B are schematic diagrams illustrating driving waveforms of a multiplexer circuit displaying a 2×2 mosaic picture in a pixel array according to some example embodiments of the present disclosure. Please refer to FIG. 1A, FIG. 1B, FIG. 11A to FIG. 11D, FIG. 12A and FIG. 12B. In some example embodiments, the switch group MG1*b* is compatible with the 2MUX panel structure. In the application of the multiplexer circuit MUX, sometimes the multiplexer circuit MUX that switches adjacent panel traces (such as Lpan1 to Lpan9) is disposed (or built-in) on the same panel (not shown) along with the pixel array Parray. Therefore, the source driver 130 may be designed to output the panel voltage (VP1 to VP5) to the panel (not shown) through only half of the pad, and is normally designed to perform such operation through even-numbered pads or odd-numbered pads.

FIG. 12A explains the operation when odd-numbered pads are connected to a panel with 2MUX. As such, in some example embodiments, the control signals CALO and CLC1 switch the control of each scanning line twice, that is, the first phase period PHS1 and the second phase period PHS2 of each horizontal scanning period (such as Scn1 to Scn2) are enabled, while other signals always remain off. Moreover, the amplifiers AMP1 to AMP4 of the data channels DCH1 to DCH4 are respectively responsible for the 1st, 5th, 3rd, and 7th panel traces Lpan1, Lpan5, Lpan3, and Lpan7. Therefore, by arranging the panel data Dpan input from data channels DCH1 to DCH4, the 2MUX scenario may be realized.

FIG. 12A explains the operation when even-numbered pads are connected to a panel with 2MUX. Similarly, the control signals CLB1 and CLC0 are switched twice relative to the control of each scanning line, that is, the first phase period PHS1 and the second phase period PHS2 of each horizontal scanning period (such as Scn1 to Scn2) are enabled, while other signals always remain off. Moreover, the amplifiers AMP1 to AMP4 of the data channels DCH1 to DCH4 are respectively responsible for the 2nd, 6th, 4th, and 8th panel traces Lpan2, Lpan4, Lpan6 and Lpan8. Therefore, the switch group MG1*b* may be compatible with the 2MUX panel structure at no additional cost.

Furthermore, in the first voltage output period (e.g., shown as FIG. 12A), during the first phase period PHS1 and the second phase period PHS2 of the horizontal scanning period (such as Scn1, Scn2), the first switch SW1, the third switch SW3, the fifteenth switch SW15 and the sixteenth switch SW16 are turned on, and the second switch SW2, the fourth switch SW4 to the eighth switch SW8, the thirteenth switch SW13 and the fourteenth switch SW14 are turned off. Moreover, in the second voltage output period (shown as FIG. 12B), during the first phase period PHS1 and the second phase period PHS2 of the horizontal scanning periods Scn1 and Scn2, the sixth switch SW6, the eighth switch SW8, the thirteenth switch SW13 and the fourteenth switch SW14 are turned on, and the first switch SW1 to the fifth switch SW5, the seventh switch SW7, the fifteenth switch SW15 and the sixteenth switch SW16 are turned off.

Figure 13:
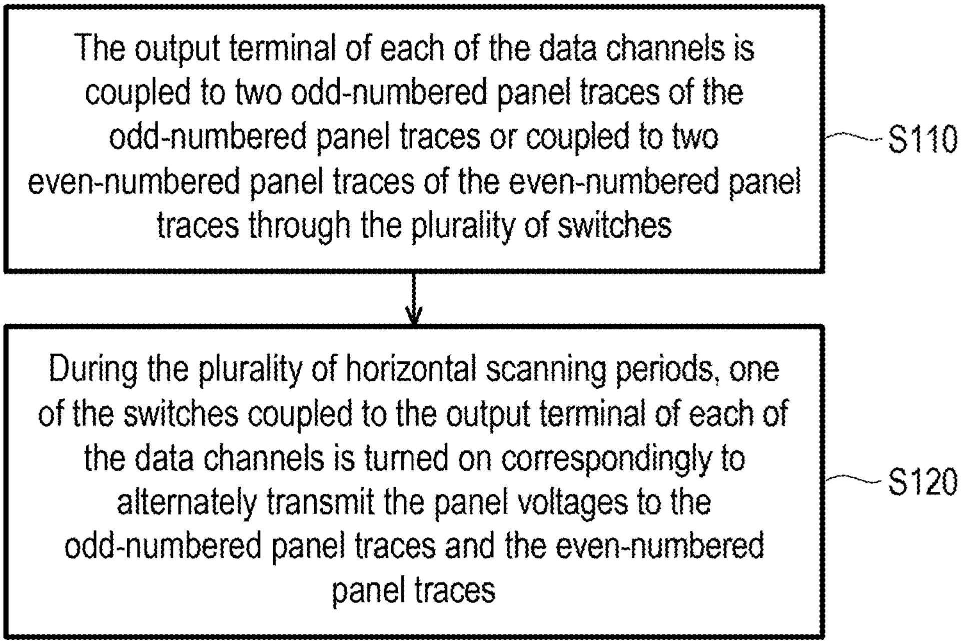
FIG. 13 is a system schematic diagram of a panel voltage multiplexing method of a display apparatus according to some example embodiments of the present disclosure.

FIG. 13 is a system schematic diagram of a panel voltage multiplexing method of a display apparatus according to some example embodiments of the present disclosure. Please refer to FIG. 13. In some example embodiments, the display apparatus includes a plurality of data channels that provide a plurality of panel voltages, a pixel array having a plurality of first color pixel circuits, a plurality of second color pixel circuits, and a plurality of third color pixels arranged in an array, a plurality of odd-numbered panel traces that individually and alternately couple a portion of the first color pixel circuits and a portion of the second color pixel circuits, and a plurality of even-numbered panel traces that individually couple a portion of the third color pixel circuits and a multiplexer circuit divided into a plurality of switch groups. Furthermore, the panel voltage multiplexing method of the display apparatus includes the following steps. In step S110, the output terminal of each of the data channels is coupled to two odd-numbered panel traces of the odd-numbered panel traces or coupled to two even-numbered panel traces of the even-numbered panel traces. In step S120, during the plurality of horizontal scanning periods, one of the switches coupled to the output terminal of each of the data channels is turned on correspondingly to alternately transmit the panel voltages to the odd-numbered panel traces and the even-numbered panel traces. The order of steps S110 and S120 is for illustration, and the inventive concepts are not limited thereto. Moreover, the details of steps S110 and S120 may be derived from some example embodiments of FIG. 1A, FIG. 1B, FIG. 3A, FIG. 3B, FIG. 5A, FIG. 5B, FIG. 7A, FIG. 7B, FIG. 8A, FIG. 8B, FIG. 9A, FIG. 9B, FIG. 10A, FIG. 10B, FIG. 11A, FIG. 11B, FIG. 11C, FIG. 11D, FIG. 12A and FIG. 12B, and related details will not be described again here.

In common test patterns (such as pure red picture, pure green picture, pure blue picture, black/white, 1×1 mosaic and 2×2 mosaic), the multiplexer circuit MUX of the present disclosure may operate to reduce the power consumption of the source driver 130. Furthermore, the circuit structure shown in the switch group MG1 may reduce power in the operating modes of the pure red picture, the pure green picture, and the pure blue picture, especially in the operating mode of the pure green picture. For the circuit structure shown in the switch group MG1*a*, through the plurality of switches that swap the red pixel circuit/blue pixel circuit, the power consumption of the pure red picture, the pure blue picture and 1×1 mosaic may be further reduced. However, the effect of the circuit structure shown by the switch group MG1 and the switch group MG1*a* cannot be applied to the 2×2 mosaic pattern. Therefore, a hybrid switch group MG1*b* is provided, through which it is possible to reduce the power consumption of the source driver 130 compared to the conventional multiplexer circuit.

To sum up, in the display apparatus and the panel voltage multiplexing method thereof according to some example embodiments of the present disclosure, by using a plurality switches to couple the output terminal of each of the data channels to two odd-numbered panel traces that couple the first color pixel circuit and the second color pixel circuit, or to couple to two even-numbered panel traces that couple the third color pixel circuits, even if the panel traces are switched through the multiplexer circuit, the panel load seen at the output terminal of the data channel will be the same or substantially the same. Therefore, the probability of voltage level switching at the output terminal of the data channel will be significantly reduced, thereby reducing power consumption of the source driver. For example, according to some example embodiments, there may be an increase in heat control, device longevity, resource efficiency and/or power efficiency of the display apparatus device based on the above multiplexing methods. Therefore, the improved devices and methods overcome the deficiencies of the conventional devices and methods of multiplexing while reducing resource consumption, and/or improving heat control and/or device longevity. Further, there is an improvement in general apparatus performance and/or operations based on less resource use over the life of the apparatus.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

Although the present disclosure has been disclosed in some example embodiments, they are not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A display apparatus, comprising:

a source driver including a plurality of data channels, the plurality of data channels including respective output terminals, the output terminals configured to provide a plurality of panel voltages;

a pixel array including a plurality of first color pixel circuits, a plurality of second color pixel circuits, and a plurality of third color pixel circuits in an array;

a plurality of panel traces including a plurality of odd-numbered panel traces and a plurality of even-numbered panel traces alternately, each of the odd-numbered panel traces alternately coupled to a portion of the first color pixel circuits and a portion of the second color pixel circuits, and each of the even-numbered panel traces coupled to a portion of the third color pixel circuits, wherein the odd-numbered panel traces are coupled exclusively to the portions of the first color pixel circuits and the portions of the second color pixel circuits; and a multiplexer circuit including a plurality of switches, the plurality of switches configured to couple the output terminal of each of the data channels to two odd-numbered panel traces of the odd-numbered panel traces or to two even-numbered panel traces of the even-numbered panel traces, wherein the plurality of switches are divided into a plurality of switch groups, each of the plurality of switch groups comprises:

a first switch coupled between an output terminal of a first data channel of the data channels and a first odd-numbered panel trace of the odd-numbered panel traces;

a second switch coupled between an output terminal of a second data channel of the data channels and a first even-numbered panel trace of the even-numbered panel traces;

a third switch coupled between an output terminal of a third data channel of the data channels and a second odd-numbered panel trace of the odd-numbered panel traces;

a fourth switch coupled between an output terminal of a fourth data channel of the data channels and a second even-numbered panel trace of the even-numbered panel traces;

a fifth switch coupled between the output terminal of the first data channel and a third odd-numbered panel trace of the odd-numbered panel traces;

a sixth switch coupled between the output terminal of the second data channel and a third even-numbered panel trace of the even-numbered panel traces;

a seventh switch coupled between the output terminal of the third data channel and a fourth odd-numbered panel trace of the odd-numbered panel traces; and an eighth switch coupled between the output terminal of the fourth data channel and a fourth even-numbered panel trace of the even-numbered panel traces;

a timing controller configured to control the plurality of switches, wherein the timing controller is configured to turn on the first switch, the second switch, the third switch, and the fourth switch during a first phase period of a horizontal scanning period, and turn on the fifth switch, the sixth switch, the seventh switch, and the eighth switch during a second phase period that does not overlap with the first phase period in the horizontal scanning period, wherein each of the plurality of switch groups further comprises:

a ninth switch coupled between the output terminal of the first data channel and the first switch and the fifth switch;

a tenth switch coupled between the output terminal of the first data channel and the third switch and the seventh switch;

an eleventh switch coupled between the output terminal of the third data channel and the first switch and the fifth switch; and a twelfth switch coupled between the output terminal of the third data channel and the third switch and the seventh switch.

2. The display apparatus according to claim 1, further comprising a timing controller configured to control the plurality of switches, wherein the timing controller is configured to turn on the first switch, the second switch, the third switch, and the fourth switch during a first phase period of a first horizontal scanning period and a subsequent second horizontal scanning period, turn on the fifth switch, the sixth switch, the seventh switch, and the eighth switch during a second phase period that does not overlap with the first phase period in the first horizontal scanning period and the second horizontal scanning period, turn on the ninth switch and the twelfth switch during the first horizontal scanning period, and turn on the tenth switch and the eleventh switch are turned on during the second horizontal scanning period.

3. The display apparatus according to claim 1, further comprising a timing controller configured to control the plurality of switches, wherein the timing controller is configured to turn on the first switch, the second switch, the third switch, and the fourth switch during a first phase period of a first horizontal scanning period, a second horizontal scanning period, a third horizontal scanning period and a fourth horizontal scanning period in sequence, turn on the fifth switch, the sixth switch, the seventh switch, and the eighth switch during a second phase period that does not overlap with the first phase period in the first horizontal scanning period to the fourth horizontal scanning period, turn on the ninth switch and the twelfth switch during the first horizontal scanning period and the second horizontal scanning period, and turn on the tenth switch and the eleventh switch during the third horizontal scanning period and the fourth horizontal scanning period.

4. The display apparatus according to claim 1, further comprising a timing controller configured to control the plurality of switches, wherein the timing controller is configured to turn on the first switch, the second switch, the third switch and the fourth switch during a first phase period of a horizontal scanning period, turn on the fifth switch, the sixth switch, the seventh switch and the eighth switch during a second phase period that does not overlap with the first phase period in the horizontal scanning period, turn on the ninth switch and the twelfth switch during the horizontal scanning period, and turn off the tenth switch and the eleventh switch during the horizontal scanning period.

5. The display apparatus according to claim 1, wherein the first color pixel circuits comprise a plurality of red pixel circuits, the second color pixel circuits comprise a plurality of blue pixel circuits, and the third color pixel circuits comprise a plurality of green pixel circuits.

6. A display apparatus, comprising:

a source driver including a plurality of data channels, the plurality of data channels including respective output terminals, the output terminals configured to provide a plurality of panel voltages;

a pixel array including a plurality of first color pixel circuits, a plurality of second color pixel circuits, and a plurality of third color pixel circuits in an array;

a plurality of panel traces including a plurality of odd-numbered panel traces and a plurality of even-numbered panel traces alternately, each of the odd-numbered panel traces alternately coupled to a portion of the first color pixel circuits and a portion of the second color pixel circuits, and each of the even-numbered panel traces coupled to a portion of the third color pixel circuits, wherein the odd-numbered panel traces are coupled exclusively to the portions of the first color pixel circuits and the portions of the second color pixel circuits; and a multiplexer circuit including a plurality of switches, the plurality of switches configured to couple the output terminal of each of the data channels to two odd-numbered panel traces of the odd-numbered panel traces or to two even-numbered panel traces of the even-numbered panel traces, wherein the plurality of switches are divided into a plurality of switch groups, each of the plurality of switch groups comprises:

a first switch coupled between an output terminal of a first data channel of the data channels and a first odd-numbered panel trace of the odd-numbered panel traces;

a second switch coupled between an output terminal of a second data channel of the data channels and a first even-numbered panel trace of the even-numbered panel traces;

a third switch coupled between an output terminal of a third data channel of the data channels and a second odd-numbered panel trace of the odd-numbered panel traces;

a fourth switch coupled between an output terminal of a fourth data channel of the data channels and a second even-numbered panel trace of the even-numbered panel traces;

a fifth switch coupled between the output terminal of the first data channel and a third odd-numbered panel trace of the odd-numbered panel traces;

a sixth switch coupled between the output terminal of the second data channel and a third even-numbered panel trace of the even-numbered panel traces;

a seventh switch coupled between the output terminal of the third data channel and a fourth odd-numbered panel trace of the odd-numbered panel traces; and an eighth switch coupled between the output terminal of the fourth data channel and a fourth even-numbered panel trace of the even-numbered panel traces, wherein each of the switch groups further comprises:

a thirteenth switch coupled between the output terminal of the first data channel and the first even-numbered panel trace;

a fourteenth switch coupled between the output terminal of the third data channel and the second even-numbered panel trace;

a fifteenth switch coupled between the output terminal of the second data channel and the third odd-numbered panel trace; and a sixteenth switch coupled between the output terminal of the fourth data channel and the fourth odd-numbered panel trace.

7. The display apparatus according to claim 6, further comprising a timing controller configured to control the plurality of switches, wherein the timing controller is configured to turn on the first switch, the third switch, the fifteenth switch, and the sixteenth switch during a first phase period of a horizontal scanning period, turn on the sixth switch, the eighth switch, the thirteenth switch, and the fourteenth switch in a second phase period that does not overlap with the first phase period in the horizontal scanning period, and turn off the second switch, the fourth switch, the fifth switch, and the seventh switch during the horizontal scanning period.

8. The display apparatus according to claim 6, further comprising a timing controller configured to control the plurality of switches, wherein the timing controller is configured to in a first voltage output period, turn on the first switch, the third switch, the fifteenth switch, and the sixteenth switch during a first phase period and a second phase period of a first horizontal scanning period, and turn off the second switch, the fourth switch to the eighth switch, the thirteenth switch, and the fourteenth switch, and in a second voltage output period different from the first voltage output period, turn on the sixth switch, the eighth switch, the thirteenth switch, and the fourteenth switch during a third phase period and a fourth phase period of a second horizontal scanning period, and turn off the first switch to the fifth switch, the seventh switch, the fifteenth switch, and the sixteenth switch.

9. A panel voltage multiplexing method of a display apparatus, the display apparatus comprising a plurality of data channels configured to provide a plurality of panel voltages, a pixel array including a plurality of first color pixel circuits, a plurality of second color pixel circuits, and a plurality of third color pixel circuits in an array, a plurality of odd-numbered panel traces individually and alternately coupling a portion of the first color pixel circuits and a portion of the second color pixel circuits, a plurality of even-numbered panel traces individually coupling a portion of the third color pixel circuits, and a multiplexer circuit including a plurality of switches, the method comprising, wherein the odd-numbered panel traces are coupled exclusively to the portions of the first color pixel circuits and the portions of the second color pixel circuits:

coupling an output terminal of each of the data channels to two odd-numbered panel traces of the odd-numbered panel traces or to two even-numbered panel traces of the even-numbered panel traces through the switches of the multiplexer circuit; and during a plurality of horizontal scanning periods, turning on one of the switches coupled to the output terminal of each of the data channels correspondingly to alternately transmit the panel voltages to the odd-numbered panel traces and the even-numbered panel traces, wherein coupling the output terminal of each of the data channels to the two odd-numbered panel traces of the odd-numbered panel traces or to the two even-numbered panel traces of the even-numbered panel traces through the switches comprises:

coupling an output terminal of a first data channel of the data channels to a first odd-numbered panel trace of the odd-numbered panel traces through a first switch of each of a plurality of switch groups of the switches;

coupling an output terminal of a second data channel of the data channels to a first even-numbered panel trace of the even-numbered panel traces through a second switch of each of the switch groups;

coupling an output terminal of a third data channel of the data channels to a second odd-numbered panel trace of the odd-numbered panel traces through a third switch of each of the switch groups;

coupling an output terminal of a fourth data channel of the data channels to a second even-numbered panel trace of the even-numbered panel traces through a fourth switch of each of the switch groups;

coupling the output terminal of the first data channel to a third odd-numbered panel trace of the odd-numbered panel traces through a fifth switch of each of the switch groups;

coupling the output terminal of the second data channel to a third even-numbered panel trace of the even-numbered panel traces through a sixth switch of each of the switch groups;

coupling the output terminal of the third data channel to a fourth even-numbered panel trace of the odd-numbered panel traces through a seventh switch of each of the switch groups; and coupling the output terminal of the fourth data channel to a fourth odd-numbered panel trace of the even-numbered panel traces through an eighth switch of each of the switch groups, wherein the first switch, the second switch, the third switch, and the fourth switch are turned on during a first phase period of each of the horizontal scanning periods, and the fifth switch, the sixth switch, the seventh switch, and the eighth switch are turned on during a second phase period that does not overlap with the first phase period in each of the horizontal scanning periods;

coupling the output terminal of the first data channel and the first switch and the fifth switch through a ninth switch of each of the switch groups;

coupling the output terminal of the first data channel and the third switch and the seventh switch through a tenth switch of each of the switch groups;

coupling the output terminal of the third data channel and the first switch and the fifth switch through an eleventh switch of each of the switch groups; and coupling the output terminal of the third data channel and the third switch and the seventh switch through a twelfth switch of each of the switch groups.

10. The method according to claim 9, wherein

The first switch, the second switch, the third switch, and the fourth switch are turned on during a first phase period of a first horizontal scanning period and a subsequent second horizontal scanning period of the horizontal scanning periods, the fifth switch, the sixth switch, the seventh switch, and the eighth switch are turned on during a second phase period that does not overlap with the first phase period in the first horizontal scanning period and the second horizontal scanning period, the ninth switch and the twelfth switch are turned on during the first horizontal scanning period, and the tenth switch and the eleventh switch are turned on during the second horizontal scanning period.

11. The method according to claim 9, wherein the first switch, the second switch, the third switch, and the fourth switch are turned on during a first phase period of a first horizontal scanning period, a second horizontal scanning period, a third horizontal scanning period and a fourth horizontal scanning period of the horizontal scanning periods, the fifth switch, the sixth switch, the seventh switch, and the eighth switch are turned on during a second phase period that does not overlap with the first phase period in the first horizontal scanning period to the fourth horizontal scanning period, the ninth switch and the twelfth switch are turned on during the first horizontal scanning period and the second horizontal scanning period, and the tenth switch and the eleventh switch are turned on during the third horizontal scanning period and the fourth horizontal scanning period.

12. The method according to claim 9, wherein the first switch, the second switch, the third switch, and the fourth switch are turned on during a first phase period of each of the horizontal scanning periods, the fifth switch, the sixth switch, the seventh switch, and the eighth switch are turned on during a second phase period that does not overlap with the first phase period in each of the horizontal scanning periods, the ninth switch and the twelfth switch are turned on during the horizontal scanning periods, and the tenth switch and the eleventh switch are turned off during the horizontal scanning periods.

* * * * *